(12) United States Patent
Akiyama et al.

(10) Patent No.: US 9,830,336 B2
(45) Date of Patent: Nov. 28, 2017

(54) INFORMATION PROCESSING DEVICE, INFORMATION PROCESSING METHOD AND INFORMATION PROCESSING PROGRAM

(71) Applicant: NEC Corporation, Minato-ku, Tokyo (JP)

(72) Inventors: Tatsuo Akiyama, Tokyo (JP); Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

(21) Appl. No.: 14/434,673

(22) PCT Filed: Oct. 2, 2013

(86) PCT No.: PCT/JP2013/005878
§ 371 (c)(1),
(2) Date: Apr. 9, 2015

(87) PCT Pub. No.: WO2014/061222
PCT Pub. Date: Apr. 24, 2014

(65) Prior Publication Data
US 2015/0278249 A1 Oct. 1, 2015

(30) Foreign Application Priority Data
Oct. 18, 2012 (JP) ................................. 2012-230886

(51) Int. Cl.
*G06F 17/00* (2006.01)
*G06F 17/30* (2006.01)
(Continued)

(52) U.S. Cl.
CPC .... *G06F 17/30259* (2013.01); *G06F 17/3025* (2013.01); *G06F 17/30244* (2013.01); *G06K 9/6892* (2013.01); *G06K 17/0016* (2013.01)

(58) Field of Classification Search
CPC .......... G06F 17/30259; G06F 17/3025; G06K 9/6892
See application file for complete search history.

(56) References Cited

U.S. PATENT DOCUMENTS

| | | | |
|---|---|---|---|
| 2002/0044691 A1* | 4/2002 | Matsugu | G06K 9/20 382/218 |
| 2007/0047819 A1* | 3/2007 | Hull | G06K 9/00456 382/190 |

(Continued)

FOREIGN PATENT DOCUMENTS

| | | |
|---|---|---|
| JP | 2002-245048 A | 8/2002 |
| JP | 2009-506394 A | 2/2009 |

(Continued)

OTHER PUBLICATIONS

International Search Report for PCT Application No. PCT/JP2013/005878, dated Oct. 29, 2013.
English Translation for Write Opinion of PCT/JP2013/005878.

*Primary Examiner* — Utpal Shah

(57) ABSTRACT

An image comparison unit (81) compares a query image with a registered image to detect, in the registered image, a region corresponding to the query image. An action information determining unit (82), on the basis of intermediate information in which sub-region information identifying sub-regions in the registered image and action information representing information processing to be executed by a target device are associated with each other, identifies sub-regions on the basis of the sub-region information, chooses a sub-region having the highest degree of matching with the detected region among the identified sub-regions, and identifies action information corresponding to the chosen sub-region. An action information execution unit (83) causes the target device to execute information processing corresponding to the action information.

11 Claims, 20 Drawing Sheets

(51) Int. Cl.
    *G06K 17/00*     (2006.01)
    *G06K 9/68*     (2006.01)

(56) References Cited

U.S. PATENT DOCUMENTS

| | | | |
|---|---|---|---|
| 2011/0052069 A1* | 3/2011 | Nakabayashi | G06F 17/30256 382/190 |
| 2011/0317031 A1* | 12/2011 | Honda | H04N 5/23219 348/229.1 |
| 2012/0063688 A1* | 3/2012 | Honma | G06F 17/30256 382/218 |
| 2012/0256947 A1* | 10/2012 | Akira | G06K 9/50 345/619 |
| 2012/0256951 A1* | 10/2012 | Tsukagoshi | H04N 13/0048 345/629 |

FOREIGN PATENT DOCUMENTS

| | | |
|---|---|---|
| JP | 2011-142576 A | 7/2011 |
| JP | 2012-010162 A | 1/2012 |
| WO | 2009/110410 A1 | 9/2009 |
| WO | 2010/053109 A1 | 5/2010 |

* cited by examiner

INFORMATION PROCESSING DEVICE, INFORMATION PROCESSING METHOD AND INFORMATION PROCESSING PROGRAM

This application is a National Stage Entry of PCT/JP2013/005878 filed on Oct. 2, 2013, which claims priority from Japanese Patent Application 2012-230886 filed on Oct. 18, 2012, the contents of all of which are incorporated herein by reference, in their entirety.

TECHNICAL FIELD

The present invention relates to an information processing device, an information processing method and information processing program that perform information processing corresponding to an image.

BACKGROUND ART

It is practice to convert printed media into images in these years. Such information converted into images can be electronically handled using terminal devices or the like.

PTL1 describes a mixed media document system which generates a mixed media document including at least two media (for example a printed sheet of paper as a first medium and a digital content as a second medium). The system described in PTL1 includes a content-based search database constructed with an index table and searches for a content using a text-based index. In the system described in PTL1, two-dimensional geometric positional relations between objects extracted from a printed document are stored in the index table and candidate documents are calculated from the index table on the basis of given data.

PTL2 describes a method for extracting feature points from an image. PTL3 describes calculation of the ratio between the areas of two connected regions as an invariant to affine transformation.

PTL4 describes an image search device that searches for an image including a region having a feature similar to that of a search key image. The image search device described in PTL4 extracts feature quantities from multiple regions in a registered image and compares the extracted feature quantities with a feature quantity extracted from a search key image to find a similar image that includes a region similar to the search key image.

CITATION LIST

Patent Literature

PTL1: Japanese Translation of PCT International Application Publication No. 2009-506394
PTL2: WO2010/053109
PTL3: WO2009/110410
PTL4: Japanese Patent Laid-open Publication No. 2002-245048

SUMMARY OF INVENTION

Technical Problem

Since an image into which information is converted and registered can be electronically handled, a portion of the registered image can be compared with another image. However, since the number of query image variations input for searching a portion of registered image is huge, it has been difficult to uniquely identify information processing to be executed on the basis of the huge number of image variations.

For example, while the method described in PTL1 makes the advantages of both of printed media and virtual media available, it is difficult to perform a given action (such as display of a linked page or playback of a video content) corresponding to a sub-region in a searched object (such as a document or an image) by using the method described in PTL1.

Therefore an object of the present invention is to provide an information processing device, an information processing method and an information processing program that are capable of executing information processing corresponding to input image information indicating a portion of a registered image in response to input of the image information.

Solution to Problem

An information processing device according to an exemplary aspect of the invention includes: an image comparison unit which compares a query image with a registered image to detect, in the registered image, a region corresponding to the query image; an action information determining unit which, on the basis of intermediate information in which sub-region information identifying sub-regions in the registered image and action information representing information processing to be executed by a target device are associated with each other, identifies sub-regions on the basis of the sub-region information, chooses a sub-region having the highest degree of matching with the detected region among the identified sub-regions, and identifies action information corresponding to the chosen sub-region; and an action information execution unit which causes the target device to execute information processing corresponding to the action information.

An information processing method according to an exemplary aspect of the invention includes: comparing a query image with a registered image to detect, in the registered image, a region corresponding to the query image; on the basis of intermediate information in which sub-region information identifying sub-regions in the registered image and action information representing information processing to be executed by a target device are associated with each other, identifying sub-regions on the basis of the sub-region information, choosing a sub-region having the highest degree of matching with the detected region among the identified sub-regions, and identifying action information corresponding to the chosen sub-region; and causing the target device to execute information processing corresponding to the action information.

An information processing program according to an exemplary aspect of the invention, causes a computer to execute processes including: an image comparison process for comparing a query image with a registered image to detect, in the registered image, a region corresponding to the query image; an action information determining process for, on the basis of intermediate information in which sub-region information identifying sub-regions in the registered image and action information representing information processing to be executed by a target device are associated with each other, identifying sub-regions on the basis of the sub-region information, choosing a sub-region having the highest degree of matching with the detected region among the identified sub-regions, and identifying action information corresponding to the chosen sub-region; and an action information execution process for causing the target device to execute information processing corresponding to the action information.

Advantageous Effects of Invention

According to the present invention, information processing corresponding to input image information indicating a portion of a registered image can be executed in response to input of the image information.

DESCRIPTION OF EMBODIMENTS

Preferred exemplary embodiments for carrying out the present invention will be described below in detail with reference to drawings.

First Exemplary Embodiment

Figure 1:
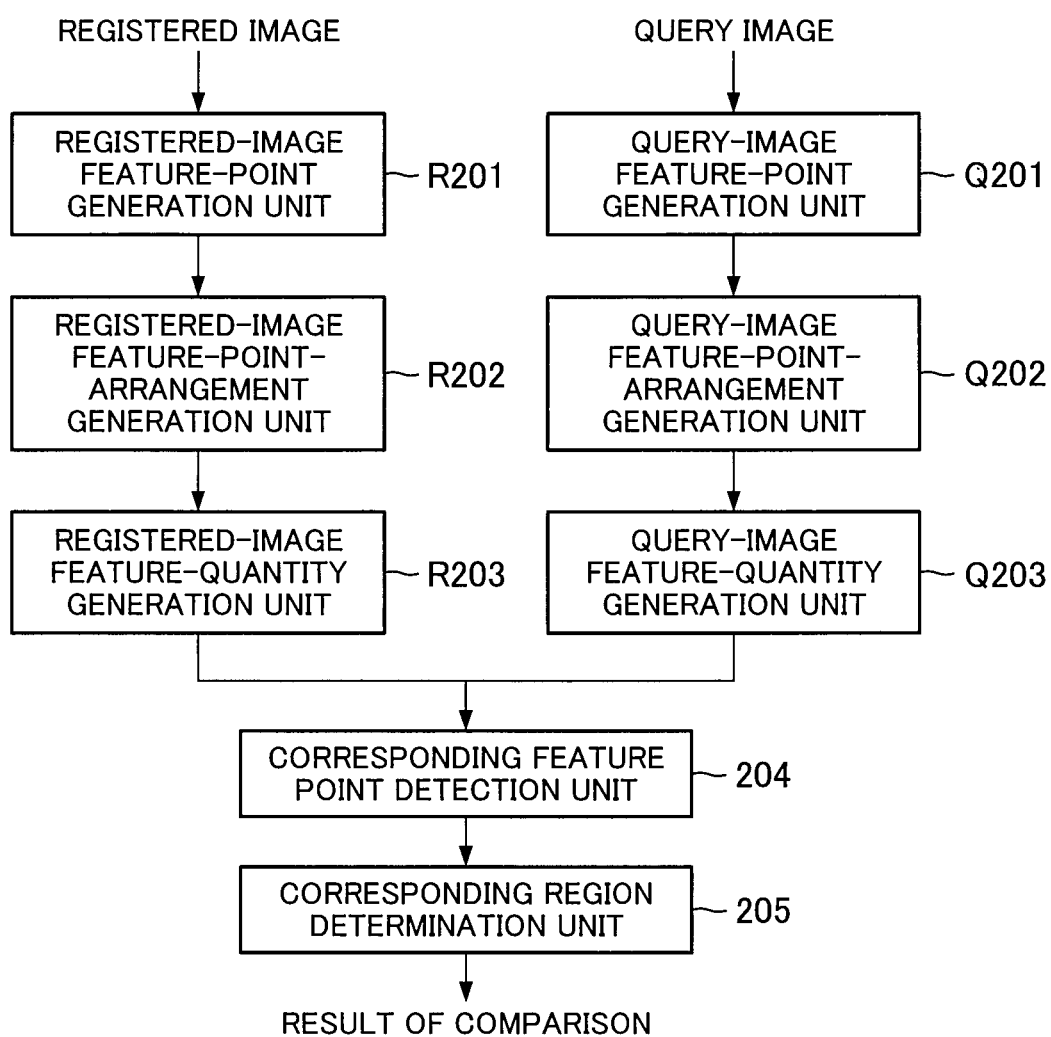
FIG. 1 is a block diagram illustrating an exemplary configuration of a first exemplary embodiment of an image sub-region extraction device according to the present invention.

FIG. 1 is a block diagram illustrating an exemplary configuration of a first exemplary embodiment of an image sub-region extraction device according to the present invention. The image sub-region extraction device of this exemplary embodiment includes a registered-image feature-point generation unit R201, a registered-image feature-point-arrangement generation unit R202, a registered-image feature-quantity generation unit R203, a query-image feature-point generation unit Q201, a query-image feature-point-arrangement generation unit Q202, a query-image feature-quantity generation unit Q203, a corresponding feature point detection unit 204, and a corresponding region determination unit 205.

These units operate generally as follows.

The registered-image feature-point generation unit R201 generates feature points from a registered image. Specifically, the registered-image feature-point generation unit R201 uses a known method to generate feature points from a registered image. The registered-image feature-point generation unit R201 may use a method such as binarization or color space clustering, for example, to extract connected regions from a registered image and may extract the centroid of each connected region as a feature point. A connected region is a region where adjacent pixels among pixels determined to belong to the same color are connected and is a known notion in the field of image processing. Unconnected regions are regions other than connected regions.

Figure 2:
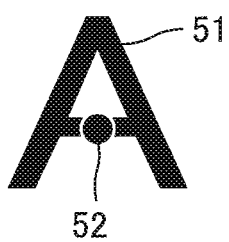
FIG. 2 is a diagram illustrating an example of a connected region.

FIG. 2 is a diagram illustrating an example of a connected region. The example in FIG. 2 illustrates that one connected region 51 has been extracted from an image 50 containing the letter "A" and the centroid of the connected region 51 has been extracted as a feature point 52. In the example in FIG. 2, the set of pixels that make up the letter "A" represents the connected region.

However, the method that can be used by the registered-image feature-point generation unit R201 to extract feature points is not limited to the method described above. For example, the registered-image feature-point generation unit R201 may use a method described in PTL2 in which a registered image feature point extraction module extracts feature points or may use a filter such as a Gaussian filter prior to extraction of feature points. A method in which the registered-image feature-point generation unit R201 extracts the centroid of a connected region as a feature point will be taken as an example in the following description.

The registered-image feature-point-arrangement generation unit R202 generates one or more feature point arrangements from feature points obtained by the registered-image feature-point generation unit R201. Specifically, the registered-image feature-point-arrangement generation unit R202 uses a known method to generate a feature point arrangement. The term feature point arrangement refers to a set of feature points that are ordered according to a predetermined rule and are located close to each other.

The registered-image feature-point-arrangement generation unit R202 may use a method described in PTL2, for example, to generate a feature point arrangement. Specifically, the registered-image feature-point-arrangement generation unit R202 may use each of feature points extracted from a registered image as a feature point of interest to generate a feature point arrangement in accordance with the following procedure.

First, the registered-image feature-point-arrangement generation unit R202 obtains feature points located close to a feature point (a feature point of interest) obtained from a registered image. The registered-image feature-point-arrangement generation unit R202 then chooses a feature point located closest to each feature point of interest as a first element. The registered-image feature-point-arrangement generation unit R202 then draws an imaginary half line that passes the feature point that is the first element from the feature point of interest as an end point and rotates the half line about the end point (the feature point of interest). In doing so, the registered-image feature-point-arrangement generation unit R202 sequentially chooses second and subsequent feature points in the order in which the other feature points intersect the half line.

The registered-image feature-quantity generation unit R203 calculates feature quantities for each feature point arrangement generated by the registered-image feature-point-arrangement generation unit R202. The feature quantities calculated here are feature quantities that are invariant to geometric transformation. One example method for calculating feature quantities that can be used is a method for calculating invariants described in PTL2.

The registered-image feature-quantity generation unit R203 may associate an order preassigned to the feature points in a feature point arrangement with one or more feature point permutations for calculating a geometric invariant and may calculate an invariant from each of the associated feature point permutations. Furthermore, the registered-image feature-quantity generation unit R203 may generate one or more triangles formed by connecting a plurality of feature points and may set an invariant calculated on the basis of the area of each triangle as a feature quantity. The method for calculating a feature quantity on the basis of the area of a triangle described above will be hereinafter referred to as the triangle-based invariant calculation method.

However, the method that can be used by the registered-image feature-quantity generation unit R203 to calculate feature quantities is not limited to the triangle-based invariant calculation. The registered-image feature-quantity generation unit R203 may use a method described in PTL3 to calculate feature quantities. Specifically, the registered-image feature-quantity generation unit R203 may use the area ratio of each connected region extracted by the registered-image feature-point generation unit R201 to extract a feature point as a feature quantity.

As described in PTL3, the ratio of the areas of two connected regions is an invariant to affine transformation. For example, a connected region in a binarized registered image can be represented as a black pixel region. Let n denote the number of feature points included in a feature point set. Then Equations $a_1$ to $a_n$ given below in sequence yield feature quantities that are invariant to affine transformation.

(number of black pixels in connected region used for calculating first feature point)/(number of black pixels in connected region used for calculating second feature point)     Equation $a_1$ (number of black pixels in connected region used for calculating second feature point)/(number of black pixels in connected region used for calculating third feature point)     Equation $a_2$

. . .

(number of black pixels in connected region used for calculating n-1-th feature point)/(number of black pixels in connected region used for calculating n-th feature point)     Equation $a_{n-1}$ (number of black pixels in connected region used for calculating n-th feature point)/(number of black pixels in connected region used for calculating first feature point)     Equation $a_n$ If approximation by affine transformation is possible locally near a feature point of interest, the feature quantity calculated according to equations $a_1$ to $a_n$ in sequence are feature quantities that are also invariant to projective transformation in a pseudo manner. The method for obtaining an invariant (feature quantity) using the ratio between the numbers of black pixels in connected regions will be hereinafter referred to as the connected-region-area-based invariant calculation method.

Note that while the connected-region-area-based invariant calculation method has been described by taking the use of a binarized registered image as an example, registered images used are not limited to binarized registered images. For example, if a method such as color space clustering has been used to extract connected regions from a registered image, the registered-image feature-quantity generation unit R203 may determine that the connected regions have been extracted with pixels included in a clustered color space and may obtain an invariant (feature quantity) using the ratio between the numbers of pixels in the connected regions.

Feature quantities described above may be used in isolation or two or more feature quantities may be used in combination. In an example given below, a feature quantity obtained by the triangle-based invariant calculation method and a feature quantity obtained by the connected-region-area based invariant calculation method are used in combination. The combination of the two feature quantities will be referred to as feature quantities for a feature point arrangement or simply as feature quantities. In this way, a feature quantity that is invariant to geometric transformation is calculated for each feature point in a registered image on the basis of a feature point arrangement. Note that the registered-image feature-quantity generation unit R203 may include a registered-image feature-quantity storage device (not depicted) that stores calculated feature quantities. In that case, the registered-image feature-quantity generation unit R203 stores calculated feature quantities in the registered-image feature-quantity storage device.

The query-image feature-point generation unit Q201 generates feature points from a query image. For example, the query-image feature-point generation unit Q201 may use a known method to generate feature points from a query image or may use the same method that is used by the registered-image feature-point generation unit R201 for generating feature points from a registered image to generate feature points. However, the methods that can be used by the query-image feature-point generation unit Q201 to generate feature points are not limited to these methods.

The query-image feature-point-arrangement generation unit Q202 generates a feature point arrangement. For example, the query-image feature-point-arrangement generation unit Q202 may use a known method to generate a feature point arrangement or may use the same method that is used by the registered-image feature-point-arrangement generation unit R202 for generating a feature point arrangement from feature points to generate a feature point arrangement. However, the methods that can be used by the query-image feature-point-arrangement generation unit Q202 to generate a feature point arrangement are not limited to these methods.

The query-image feature-quantity generation unit Q203 calculates feature quantities for each feature point arrangement generated by the query-image feature-point-arrangement generation unit Q202. The query-image feature-quantity generation unit Q203 may use the same method used by the registered-image feature-quantity generation unit R203 for calculating feature quantities to calculate feature quantities. However, the method that can be used by the query-image feature-quantity generation unit Q203 to calculate feature quantities is not limited to this method. In this way, a feature quantity that is invariant to geometric transformation is calculated for each feature point of interest in a query image on the basis of a feature point arrangement.

The corresponding feature point detection unit 204 compares feature quantities generated by the registered-image feature-quantity generation unit R203 with feature quantities generated by the query-image feature-quantity generation unit Q203 to determine whether or not feature point arrangements used for generating the feature quantities match each other.

The corresponding feature point detection unit 204 then uses the result of the determination whether or not feature point arrangements match to detect where in a registered image a feature point that corresponds to a feature point in a query image (hereinafter referred to as a corresponding feature point) is located (i.e. which of the feature points extracted from the registered image is equivalent to a feature point in a query image). The determination is made for all combinations of feature quantities generated by the registered-image feature-quantity generation unit R203 and feature quantities generated by the query-image feature-quantity generation unit Q203, for example. Alternatively, an appropriate index may be given to each feature point to accelerate the detection process, instead of performing the detection process for all combinations of feature quantities.

The corresponding region determination unit 205 uses matching feature point arrangements detected by the corresponding feature point detection unit 204 to determine where a query image is in a registered image. Specifically, the corresponding region determination unit 205 extracts a sub-region in the registered image that is identified by corresponding feature points.

Detailed operations of the corresponding feature point detection unit 204 and the corresponding region determination unit 205 will be described later.

The registered-image feature-point generation unit R201, the registered-image feature-point-arrangement generation unit R202, the registered-image feature-quantity generation unit R203, the query-image feature-point generation unit Q201, the query-image feature-point-arrangement generation unit Q202, the query-image feature-quantity generation unit Q203, the corresponding feature point detection unit 204, and the corresponding region determination unit 205 are implemented by a CPU of a computer that operates in accordance with a program (an image sub-region extraction program). For example, the program may be stored in a storage unit (not depicted) of the image sub-region extraction device and the CPU may read the program and may operate as the registered-image feature-point generation unit R201, the registered-image feature-point-arrangement generation unit R202, the registered-image feature-quantity generation unit R203, the query-image feature-point generation unit Q201, the query-image feature-point-arrangement generation unit Q202, the query-image feature-quantity generation unit Q203, the corresponding feature point detection unit 204, and the corresponding region determination unit 205 in accordance with the program.

Furthermore, each of the registered-image feature-point generation unit R201, the registered-image feature-point-arrangement generation unit R202, the registered-image feature-quantity generation unit R203, the query-image feature-point generation unit Q201, the query-image feature-point-arrangement generation unit Q202, the query-image feature-quantity generation unit Q203, the corresponding feature point detection unit 204, and the corresponding region determination unit 205 may be implemented by dedicated hardware.

While the configuration in which feature quantities are calculated in the image sub-region extraction device is illustrated in this exemplary embodiment, a configuration may be employed in which the corresponding feature point detection unit 204 of the image sub-region extraction device receives feature quantities of a registered image and feature quantities of a query image calculated in another device. In that case, the image sub-region extraction device needs only to include the corresponding feature point detection unit 204 and the corresponding region determination unit 205. Furthermore, feature quantities of a registered image calculated beforehand may be stored in a storage unit (not depicted) of the image sub-region extraction device.

Operations of this exemplary embodiment will be described below. Processing performed by the image sub-region extraction device can broadly be separated into two processes, a registration process and a search process, which will be described below separately.

Registration Process

Figure 3:
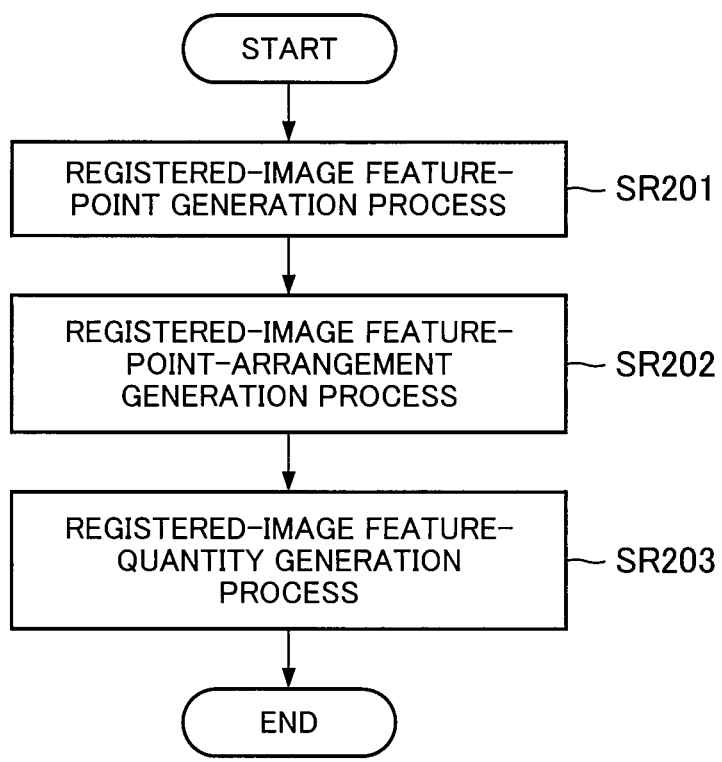
FIG. 3 is a flowchart illustrating an exemplary operation of a registration process.

FIG. 3 is a flowchart illustrating an exemplary operation of a registration process. The registration process is performed prior to the search process and generates feature quantity data required for the search process. Referring to FIG. 3, the registration process includes a registered-image feature-point generation process (step SR201), a registered-image feature-point-arrangement generation process (step SR202) and a registered-image feature-quantity generation process (step SR203).

First, the registered-image feature-point generation unit R201 extracts feature points from a registered image (step SR201). Then the registered-image feature-point-arrangement generation unit R202 generates one or more feature point arrangements on the basis of the feature points generated by the registered-image feature-point generation unit R201 (step SR202). Then the registered-image feature-quantity generation unit R203 calculates feature quantities of each of the one or more feature point arrangements generated by the registered-image feature-point-arrangement generation unit R202 (step SR203).

Search Process

Figure 4:
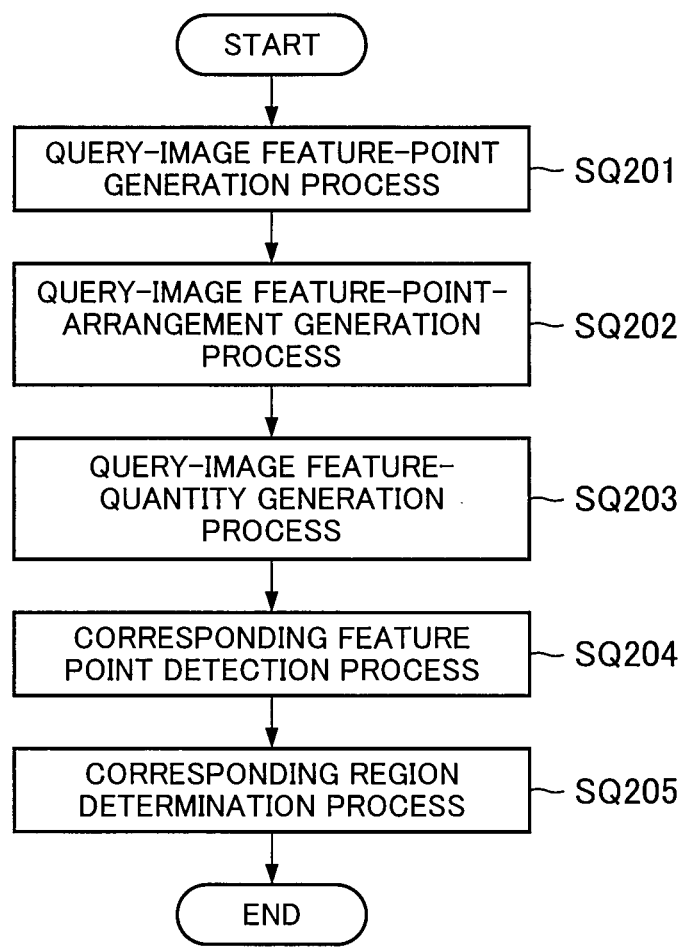
FIG. 4 is a flowchart illustrating an exemplary operation of a search process of the first exemplary embodiment.

FIG. 4 is a flowchart illustrating an exemplary operation of the search process of this exemplary embodiment. The search process is a process in which feature quantities are calculated from a query image and the feature quantities are compared with feature quantities calculated from a registered image to determine a portion of the registered image that corresponds to the query image. Referring to FIG. 4, the search process includes a query-image feature-point generation process (step SQ201), a query-image feature-point-arrangement generation process (step SQ202), a query-image feature-quantity generation process (step SQ203), a corresponding feature point detection process (step SQ204), and a corresponding region determination process (step SQ205).

First, the query-image feature-point generation unit Q201 extracts feature points from the query image (step SQ201). Then the query-image feature-point-arrangement generation unit Q202 generates one or more feature point arrangements on the basis of the feature points generated by the query-image feature-point generation unit Q201 (step SQ202). Then the query-image feature-quantity generation unit Q203 calculates feature quantities of each of the one or more feature point arrangements generated by the query-image feature-point-arrangement generation unit Q202 (step SQ203).

Figure 5:
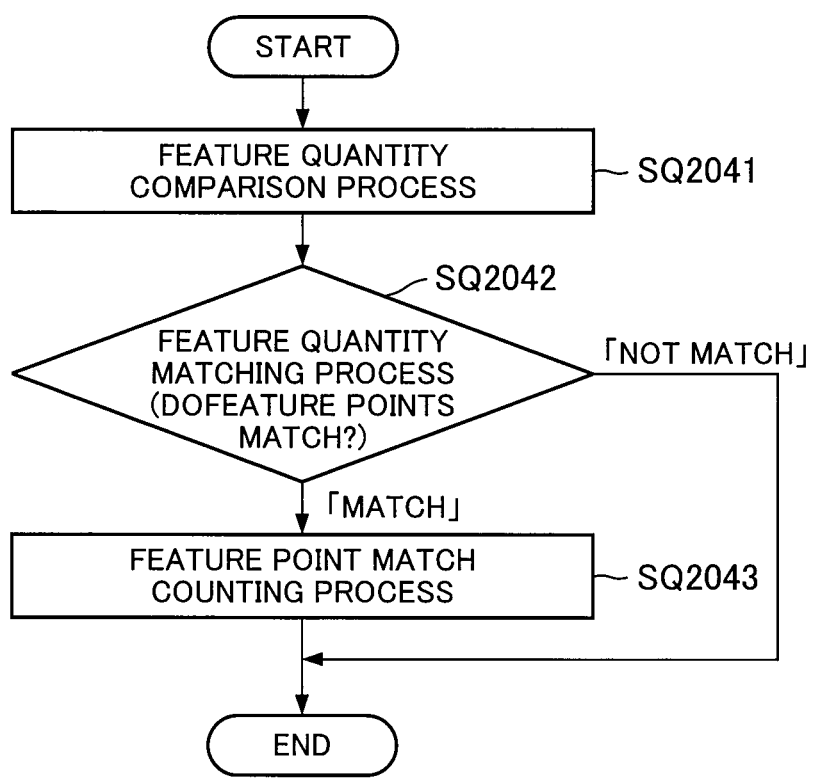
FIG. 5 is a flowchart illustrating an exemplary operation for detecting a corresponding feature point.

Then the corresponding feature point detection unit 204 detects corresponding feature points (step SQ204). Specifically, the corresponding feature point detection unit 204 detects feature points in the registered image that correspond to feature points in the query image. The process for detecting corresponding feature points will be described in detail with reference to FIG. 5. FIG. 5 is a flowchart illustrating an exemplary operation at step SQ204 of detecting corresponding feature points.

Referring to FIG. 5, the process for detecting corresponding feature points includes a feature quantity comparison process (step SQ2041), a feature quantity matching process (step SQ2042), and a feature point match counting process (step SQ2043). The process at step SQ204 described below is performed individually for all combinations of feature quantities generated by the registered-image feature-quantity generation unit R203 (hereinafter referred to as registered image feature quantities) and feature quantities generated by the query-image feature-quantity generation unit Q203 (hereinafter referred to as query image feature quantities).

At step SQ204, first the corresponding feature point detection unit 204 compares a registered image feature quantity and a query image feature quantity of a combination. The corresponding feature point detection unit 204 may use a known method such as a square distance, city block distance, or vector inner product method to calculate the distance between the registered image feature quantity and the query image feature quantity (step SQ2041). Alternatively, the corresponding feature point detection unit 204 may calculate the distance between the registered image feature quantity and the query image feature quantity in a manner described below. It can be said that the smaller the distance, the higher the degree of matching between the two feature quantities is.

First, the corresponding feature point detection unit 204 calculates the difference between each pair of corresponding elements (for example, vector elements) that represent feature quantities to be compared. If the absolute value of the difference is within a predetermined range, the corresponding feature point detection unit 204 adds 1 to the distance; if the absolute value of the difference is not within the predetermined range, the corresponding feature point detection unit 204 adds 0 to the distance. The corresponding feature point detection unit 204 repeats the process for all of the elements to calculate distances. In this case, it can be said that the greater the calculated value, the smaller the distance and the higher the degree of matching between the two feature quantities is.

The corresponding feature point detection unit 204 may combine any of the multiple methods described above to calculate the distance between a registered image feature quantity and a query image feature quantity. For example, if an invariant feature quantity and an area ratio feature quantity are used in combination, the corresponding feature point detection unit 204 may calculate the square distance for invariant feature quantity and calculate the distance by taking the difference between each pair of elements for area ratio feature quantity.

The corresponding feature point detection unit 204 then determines whether or not the registered image feature quantity and the query image feature quantity match each other (step SQ2042). Specifically, the corresponding feature point detection unit 204 determines the degree of matching between the registered image feature quantity and the query image feature quantity. If it is determined that the registered image feature quantity and the query image feature quantity match each other ("Match" at step SQ2042), the process at step SQ2043 is performed; if it is determined that the registered image feature quantity and the query image feature quantity do not match ("Not match" at step SQ2042), the process at step SQ2043 is omitted.

The corresponding feature point detection unit 204 may determine that the feature quantities match if the distance calculated at step SQ2041 is less than or equal to a predetermined threshold value, for example. If the feature quantities have been calculated from a plurality of types of feature quantities, the corresponding feature point detection unit 204 may determine that the feature quantities match as a whole if at least one type of feature quantities or at least a predetermined number of types of feature quantities match or may determine that the feature quantities match as a whole if all of the types of feature quantities match.

The corresponding feature point detection unit 204 then counts up the number of matches of feature points (step SQ2043). The corresponding feature point detection unit 204 may count up the number of matches of feature point for each feature point in the feature point arrangement used for obtaining the feature points. Alternatively, the corresponding feature point detection unit 204 may count up the number of matches for each feature point of interest used when the feature point arrangement used for obtaining registered image feature quantities has been generated. It is assumed that the initial value of the number of matches between feature points is set to 0 in an initialization process. It is assumed in the following description that the number of matches is counted up for each feature point in the feature point arrangement used for obtaining feature quantities. Note that since feature points are shared among a plurality of feature point arrangements, a plurality of numbers of matches between feature points is counted up.

Figure 6:
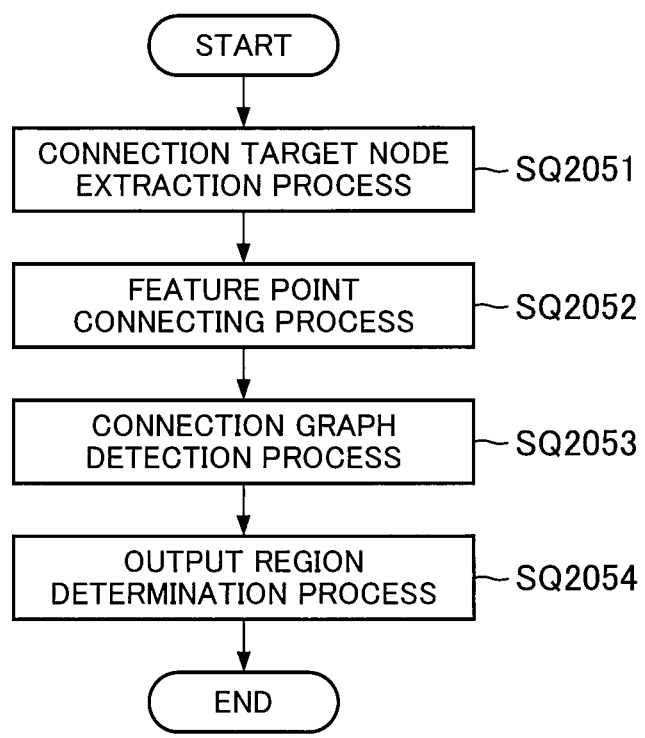
FIG. 6 is a flowchart illustrating an exemplary operation for determining a corresponding region.

Then the corresponding region determination unit 205 determines corresponding regions (step SQ205). Specifically, the corresponding region determination unit 205 determines a region in a registered image that corresponds to the query image as a corresponding region. The process for determining corresponding regions will be described below in detail with reference to FIG. 6. FIG. 6 is a flowchart illustrating an exemplary operation at step SQ205 of determining corresponding regions.

Referring to FIG. 6, the process for determining corresponding regions includes a connection target node extraction process (step SQ2051), a feature point connecting process (step SQ2052), a connection graph detection process (step SQ2053), and an output region determination process (step SQ2054).

The corresponding region determination unit 205 extracts feature points that have the numbers of matches greater than or equal to a predetermined number from the registered image as connection target nodes (step SQ2051). Node is a term used in graph theory. In this exemplary embodiment, a feature point is considered to be a node. It can be said that connection target nodes that are extracted by the corresponding region determination unit 205 are feature points that have a higher degree of matching with feature points in the query image among corresponding feature points. Accordingly, it can be said that the corresponding region determination unit 205 extracts corresponding feature points that have a higher degree of matching with feature points in the query image among corresponding feature points as connection target nodes.

Figure 7:
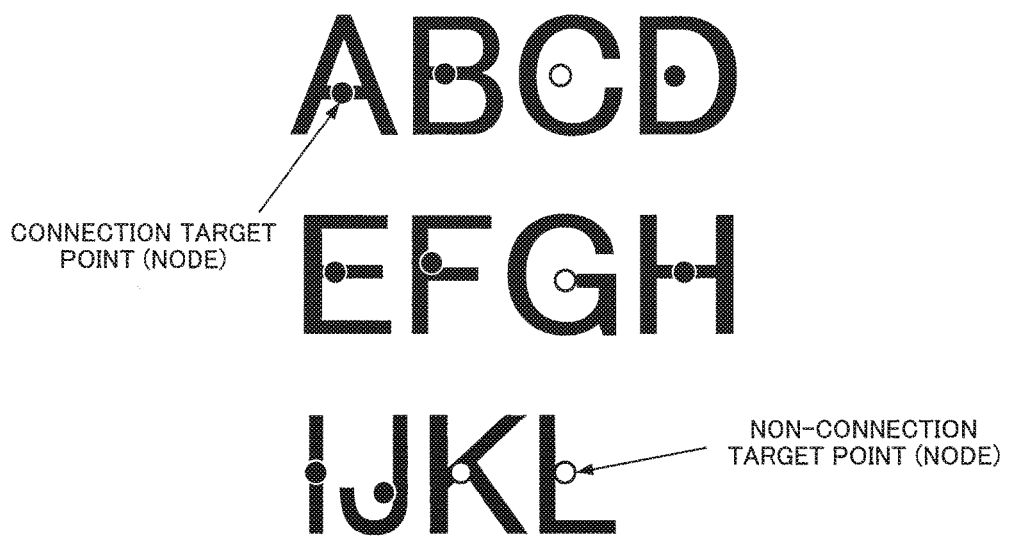
FIG. 7 is a diagram illustrating exemplary connection target nodes.

FIG. 7 is a diagram illustrating exemplary connection target nodes. In the example in FIG. 7, the black dots indicate connection target nodes and white dots indicate non-connection target nodes. A non-connection target node is a node that has not been determined to be a connection target node among the feature points (nodes).

The corresponding region determination unit 205 then adds an edge between connection target nodes if the distance between the connection target nodes is small (step SQ2052). Edge is a term used in graph theory and means the line connecting one node with another. The edge is hereinafter sometime referred to as a graph.

If the distance between connection target nodes is smaller than a predetermined threshold value, the corresponding region determination unit 205 may add an edge between the connection target nodes. Furthermore, the corresponding region determination unit 205 may add an edge between connection target nodes if the distance between the connected regions in which the connection target nodes are included is smaller than a predetermined threshold value. Here, let p1 denote a pixel that belongs to a connection region C1 and p2 denote a pixel that belongs to a connected region C2. Then the distance dist (p1, p2) between the connected regions C1 and C2 can be calculated according to Equation 1 given below, for example. Note that p1 and p2 are pixels arbitrarily chosen from the connection regions.

[Equation 1]

$$\min_{p1 \in C1, p2 \in C2} dist(p1, p2) \quad \text{(Equation 1)}$$

Figure 8:
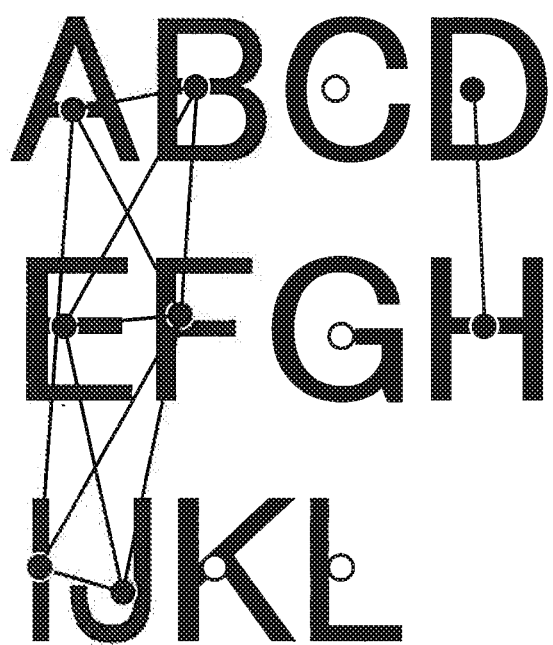
FIG. 8 is a diagram illustrating exemplary edges added between connection target nodes.

FIG. 8 is a diagram illustrating exemplary edges added between connection target nodes by the node connecting process. Each of the edges illustrated in FIG. 8 is added to connect each of the connection target nodes illustrated in FIG. 7 to another.

The corresponding region determination unit 205 then detects one or more connection graphs from among the graphs generated at step SQ2052 (step SQ2053). The term connection graph means a combination of a series of nodes connected by edges and the edges. It is known that one or more connection graphs are detected by performing a depth first search, which is a known method in graph theory. The corresponding region determination unit 205 therefore may perform the depth first search to detect connection graphs. In the example in FIG. 8, two connection graphs are detected.

The corresponding region determination unit 205 then chooses a region to be output on the basis of the connection graphs detected at step SQ2053 (step SQ2054). For example, let $(x_{min\_j(k)}, y_{min\_j(k)})$, $(x_{max\_j(k)}, y_{min\_j(k)})$, $(x_{min\_j(k)}, y_{max\_j(k)})$, and $(x_{max\_j(k)}, y_{max\_j(k)})$ denote the coordinates of the four corners of the circumscribed rectangle of a connected region including a node j (j is an integer) in a connection graph $G_k$ (k is an integer greater than or equal to 1). Then the corresponding region determination unit 205 may determine that the region to be output is a rectangular region having diagonal vertices at $(x_{min\_min(k)}, y_{min\_min(k)})$ and $(x_{max\_max(k)}, y_{max\_max(k)})$. The coordinates of the vertices meet the following conditions.

[Equation 2]

$$xmin\_min(k) = \min_{j \in G_k}(xmin\_j(k))$$

$$ymin\_min(k) = \min_{j \in G_k}(ymin\_j(k))$$

$$xmax\_max(k) = \max_{j \in G_k}(xmax\_j(k))$$

$$ymax\_max(k) = \max_{j \in G_k}(ymax\_j(k))$$

Figure 9:
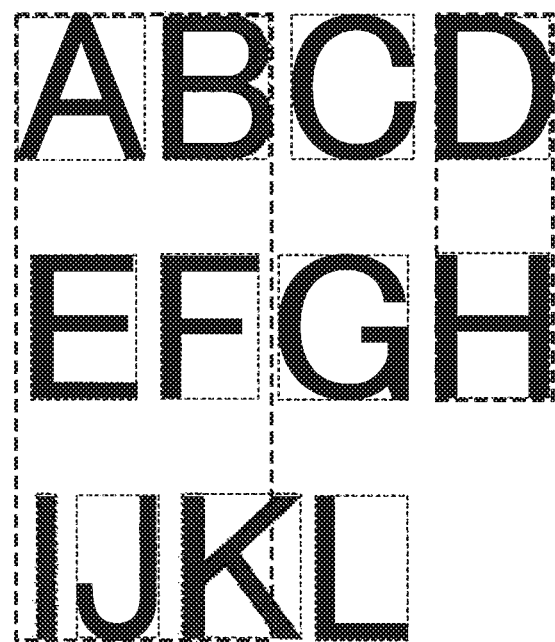
FIG. 9 is a diagram illustrating exemplary output regions.

FIG. 9 is a diagram illustrating exemplary output regions. Dotted rectangles in FIG. 9 represent the circumscribed rectangles of connected regions. Dashed rectangles in FIG. 9 represent two output regions determined on the basis of the two connection graphs illustrated in FIG. 8.

In the foregoing description, the region circumscribing a connected region is represented by a rectangle that can be identified by the coordinates of the four corners. Alternatively, the region circumscribing a connected region can be represented by a circle that is centered at a node j and has a radius r (r is a real number greater than or equal to 0). Note that r=0 is the same in meaning as $x_{min\_j(k)} = x_{max\_j(k)}$ and $yy_{min\_j(k)} = y_{max\_j(k)}$ in the foregoing description.

The method that can be used by the corresponding region determination unit 205 to determine output regions is not limited to the method described above. The corresponding region determination unit 205 may choose as an output region the union of circumscribed rectangular regions of connected regions including nodes that belong to a connection graph or the union of circular regions that is centered at a node j and has a radius r (r is a real number greater than or equal to 0).

If a plurality of output regions are obtained, the corresponding region determination unit 205 may use indicators of the degrees of certainty of output regions to determine an output region. The indicator of the degree of certainty of an output region may be the area of the output region, the number of connection target nodes in the output region, the number of feature points in the output region, the maximum number of matches of feature points (or connection target nodes) in the output region, the sum of the numbers of matches of feature points (or connection target nodes) in the output region, or the like, for example. If a plurality of output regions are obtained, the corresponding region determination unit 205 may determine that output regions with higher (greater) indicators are more certain and may choose an output region that is more certain on the basis of the indicators.

In this way, the corresponding region determination unit 205 identifies connection target nodes that are connected by edges to determine connected regions and extracts a region derived from the connected regions as a sub-region in a registered image.

As described above, according to this exemplary embodiment, the corresponding feature point detection unit 204 compares the degrees of match between registered image feature quantities and query image feature quantities with one another to detect corresponding feature points. Then the corresponding region determination unit 205 extracts a sub-region in the registered image that is identified by corresponding feature points that have higher degree of matching with feature points in a query image among the detected corresponding feature points. Accordingly, even if a query image that differs from a registered image in resolution or shooting angle is used, a sub-region that corresponds to the query image can be extracted from the registered image.

Specifically, if it is determined that a query image feature quantity and a registered image feature quantity match each other, the corresponding feature point detection unit 204 counts up, for each corresponding feature point, the number of matches with feature points in a feature point arrangement that has been used for calculating the query image feature quantities. Then the corresponding region determination unit 205 chooses corresponding feature points that have the numbers of matches greater than or equal to a predetermined number as connection target nodes and extracts a sub-region in the registered image that is identified on the basis of the connection target nodes.

In other words, a feature point arrangement is obtained on the basis of the centroids of connected regions for each of the registered image and the query image. A feature quantity that is invariant to geometric transformation is calculated from a feature point and an arrangement of a connected region corresponding to the feature point, and a registered image feature quantity and a query image feature quantity are compared with each other. As a result, feature points in the registered image that correspond to the query image are detected and pieces of information about the feature points are combined to obtain an output region.

Accordingly, a region that is equivalent to the query image can be obtained from the registered image without setting a window of interest. For this reason, sub-region image matching is possible even if there are variations in size and shooting angle between the registered image and the query image.

Figure 10:
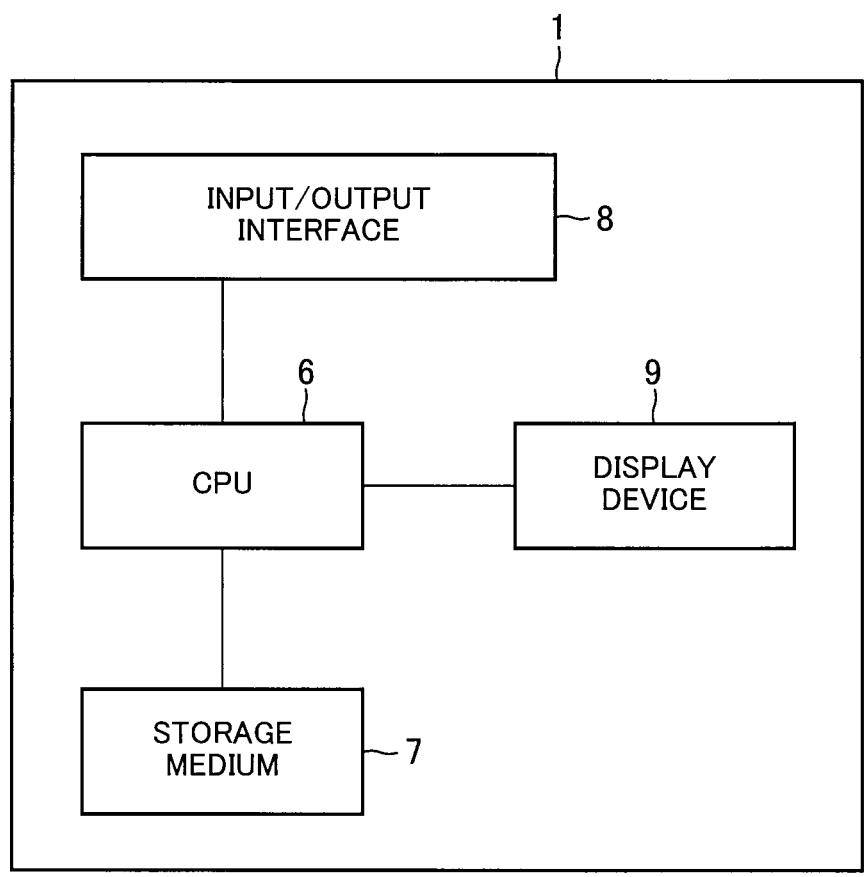
FIG. 10 is a block diagram illustrating an exemplary configuration of an information processing system capable of implementing an image sub-region extraction device.

FIG. 10 is a block diagram illustrating an exemplary configuration of an information processing system that can implement the image sub-region extraction device of this exemplary embodiment. The information processing system 1 illustrated in FIG. 10 includes a processor 6 such as a CPU (hereinafter simply referred to as the CPU 6), for example, and a storage medium 7. The information processing system 1 may include an input/output interface 8 and a display device 9.

The CPU 6 executes software programs (computer programs) that implement the units described above to control operations of the entire information processing system 1.

The storage medium 7 is a storage medium for storing software programs and data required for execution of the software programs.

The input/output interface 8 is used in data communication between the information processing system 1 and external devices. Data communicated may include, but not limited to, feature point arrangement data generated at a device external to the information processing system 1 and comparison result output data.

The input/output interface 8 needs to be able to communicate with at least the CPU 6. The input/output interface 8 may be a connector that connects a communication line that can transmit signals from an external source and equipment that receives radio signals, for example. A part of an internal signal transmission path in the information processing system 1 may be directly used as the input/output interface 8. Other examples of the input/output interface 8 may be user interface equipment for a display device 9 and a speaker (not depicted).

The display device 9 is a device for displaying results of image matching executed by the information processing system 1 and may be a display unit. While a display device 9 is depicted in FIG. 10, the display device 9 is not a component essential to the image sub-region extraction device.

Second Exemplary Embodiment

Figure 11:
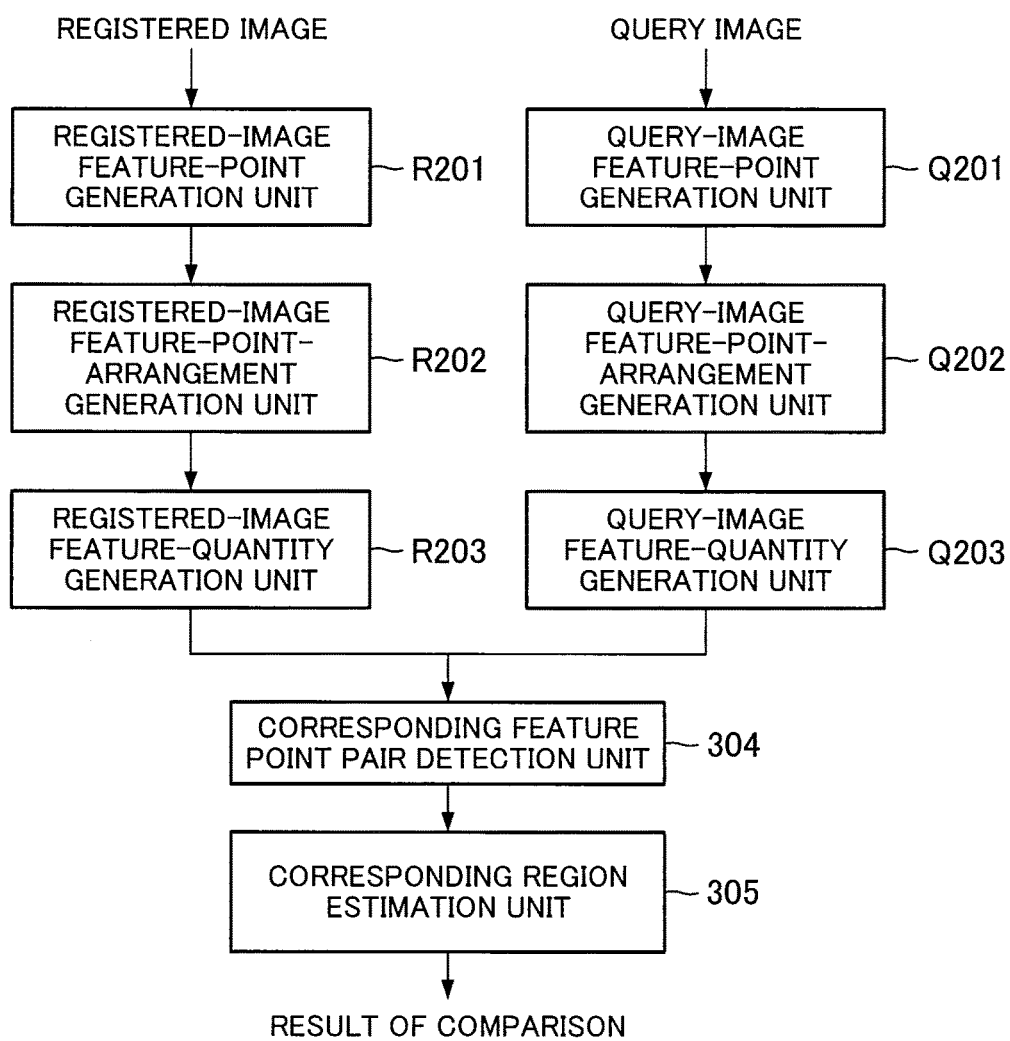
FIG. 11 is a block diagram illustrating an exemplary configuration of a second exemplary embodiment of an image sub-region extraction device according to the present invention.

A second exemplary embodiment of an image sub-region extraction device according to the present invention will be described next. FIG. 11 is a block diagram illustrating an exemplary configuration of the second exemplary embodiment of the image sub-region extraction device according to the present invention. The image sub-region extraction device of this exemplary embodiment includes a registered-image feature-point generation unit R201, a registered-image feature-point-arrangement generation unit R202, a registered-image feature-quantity generation unit R203, a query-image feature-point generation unit Q201, a query-image feature-point-arrangement generation unit Q202, a query-image feature-quantity generation unit Q203, a corresponding feature point pair detection unit 304, and a corresponding region estimation unit 305.

The image sub-region extraction device of this exemplary embodiment differs from the image sub-region extraction device of the first exemplary embodiment in that the corresponding feature point pair detection unit 304 and the corresponding region estimation unit 305 are provided in place of the corresponding feature point detection unit 204 and the corresponding region determination unit 205. The description of this exemplary embodiment will focus on differences from the first exemplary embodiment.

The corresponding feature point pair detection unit 304 includes the function of storing pairs of feature points in a query image and feature points in a registered image that have been determined to match each other in a storage medium (not depicted), in addition to the functions of the corresponding feature point detection unit 204. A pair of a feature point in the query image and a feature point in the registered image that have been determined to match each other will be hereinafter referred to as a feature point match history.

The corresponding region estimation unit 305 includes the function of estimating a geometric transformation parameter (such as a homography matrix or an affine transformation parameter) from a matching feature point arrangement detected by the corresponding feature point pair detection unit 304 and estimating a corresponding region from the estimated geometric transformation parameter and the size of a query image, in addition to the functions of the corresponding region determination unit 205.

Note that the registered-image feature-point generation unit R201, the registered-image feature-point-arrangement generation unit R202, the registered-image feature-quantity generation unit R203, the query-image feature-point generation unit Q201, the query-image feature-point-arrangement generation unit Q202, the query-image feature-quantity generation unit Q203, the corresponding feature point pair detection unit 304 and the corresponding region estimation unit 305 are implemented by a CPU of a computer that operates in accordance with a program (an image sub-region extraction program).

As in the first exemplary embodiment, each of the registered-image feature-point generation unit R201, the registered-image feature-point-arrangement generation unit R202, the registered-image feature-quantity generation unit R203, the query-image feature-point generation unit Q201, the query-image feature-point-arrangement generation unit Q202, the query-image feature-quantity generation unit Q203, the corresponding feature point pair detection unit 304, and the corresponding region estimation unit 305 may be implemented by dedicated hardware.

Operations of the image sub-region extraction device of this exemplary embodiment will be described below. Processing performed by the image sub-region extraction device of this exemplary embodiment can broadly be separated into two processes: a registration process and a search process. The registration process is similar to that of the first exemplary embodiment and therefore only the search process will be described here.

Figure 12:
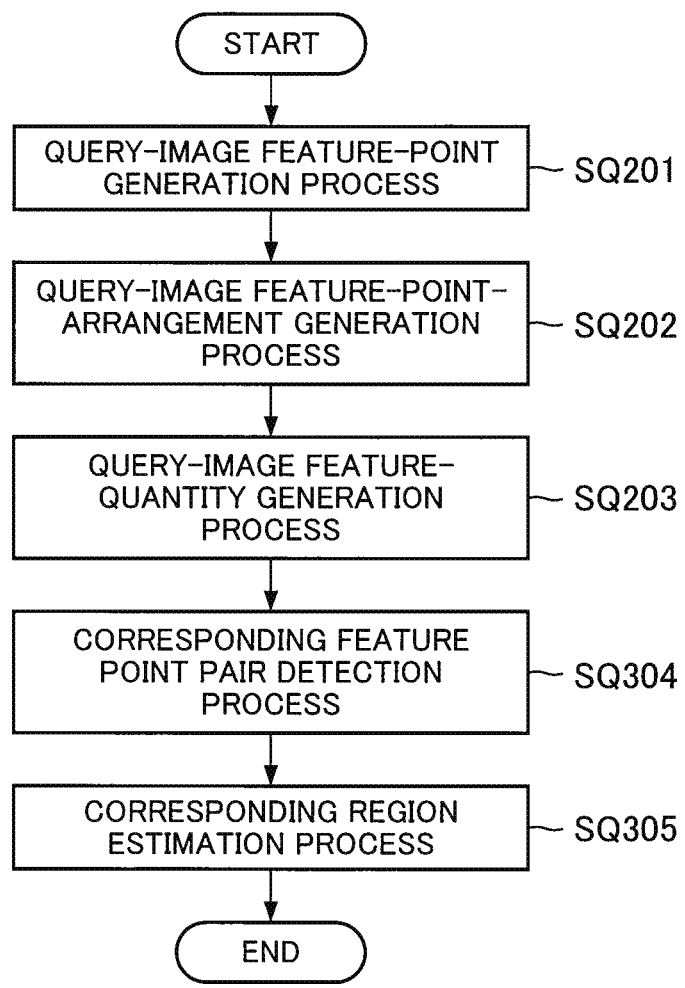
FIG. 12 is a flowchart illustrating an exemplary operation of a search process of the second exemplary embodiment.

FIG. 12 is a flowchart illustrating an exemplary operation of the search process of this exemplary embodiment. This exemplary embodiment differs from the first exemplary embodiment in that the corresponding feature point detection process SQ204 is replaced with a corresponding feature point pair detection process SQ304 and the corresponding region determination process SQ205 is replaced with a corresponding region estimation process SQ305.

Figure 13:
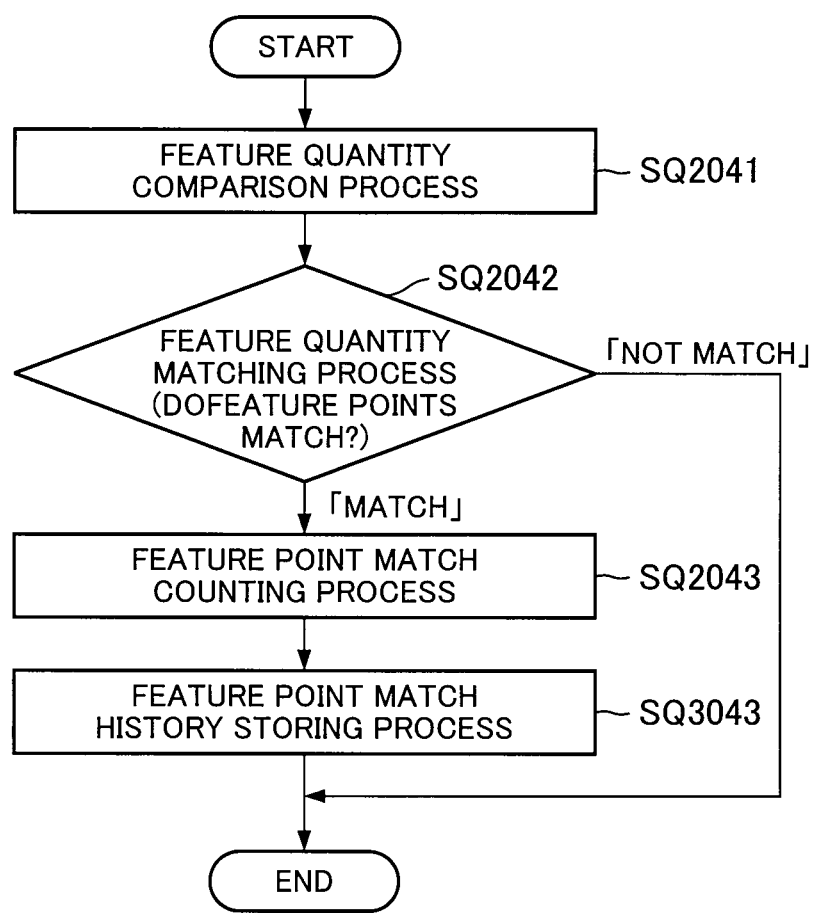
FIG. 13 is a flowchart illustrating an exemplary operation for detecting corresponding feature points.

FIG. 13 is a flowchart illustrating an exemplary operation at step SQ304 of detecting a corresponding feature point pair. Referring to FIG. 13, step SQ304 differs from step SQ204 of the first exemplary embodiment in that a feature point match history storing process SQ3043 is added after the feature point match counting process SQ2043.

If it is determined at step SQ2042 that there is a feature quantity match, the corresponding feature point pair detection unit 304 uses feature points exhibiting the matching feature quantities to generate a feature point match history (step SQ3043). Here the corresponding feature point pair detection unit 304 may determine that feature points in feature point arrangements used for obtaining feature quantities has matched. Then corresponding feature point pair detection unit 304 may pair feature points included in the feature point arrangement used for obtaining registered image feature quantities and their corresponding feature points included in the feature point arrangement used for obtaining query image feature quantities to generate a feature point match history.

Figure 14:
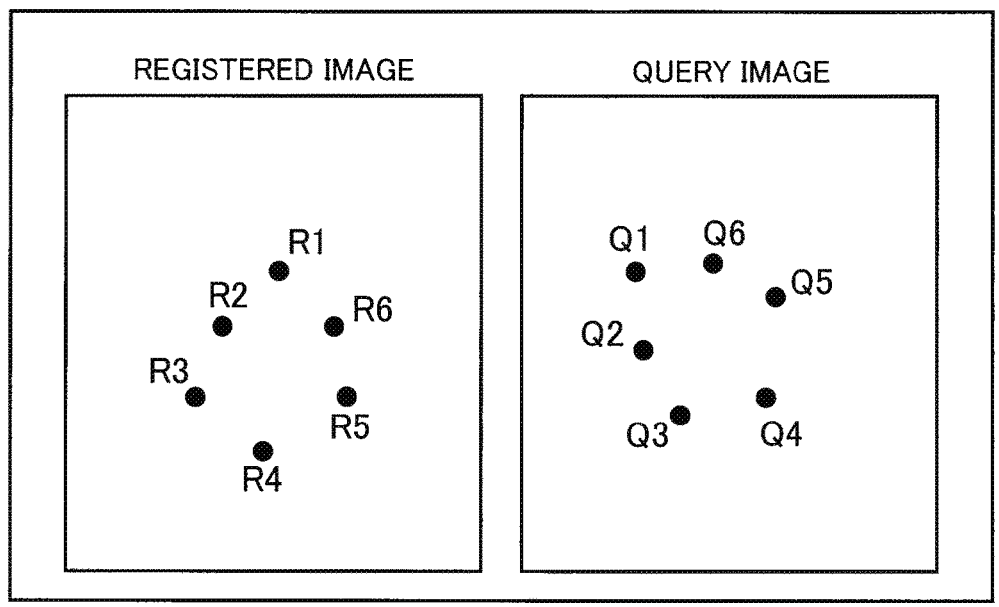
FIG. 14 is a diagram illustrating an example of generation of a feature point match history.

FIG. 14 is a diagram illustrating an example of generation of a feature point match history. It is assumed in the example illustrated in FIG. 14 that a feature point arrangement of feature points R1, R2, R3, R4, R5 and R6 ordered in this order exists in the registered image and a feature point arrangement of feature points Q1, Q2, Q3, Q4, Q5 and Q6 ordered in this order exists in the query image. If it is determined that the two feature point arrangements match each other, the corresponding feature point pair detection unit 304 may detect R1 and Q1, R2 and Q2, R3 and Q3, R4 and Q4, R5 and Q5, and R6 and Q6 as feature point pairs and generate a feature point match history.

Furthermore, the corresponding feature point pair detection unit 304 may determine that there is a match with a feature point of interest used when the feature point arrangement used for obtaining registered image feature quantities has been generated. In this case, the corresponding feature point pair detection unit 304 may pair the feature point of interest included in the feature point arrangement used for obtaining the registered image feature quantities and the feature point of interest included in the feature point arrangement used for obtaining the query image feature quantities to generate a feature point match history.

In the following description, an example will be described in which the corresponding feature point pair detection unit 304 determines that there are matches between feature points in feature point arrangements used for obtaining feature quantities and generates a feature point match history.

Figure 15:
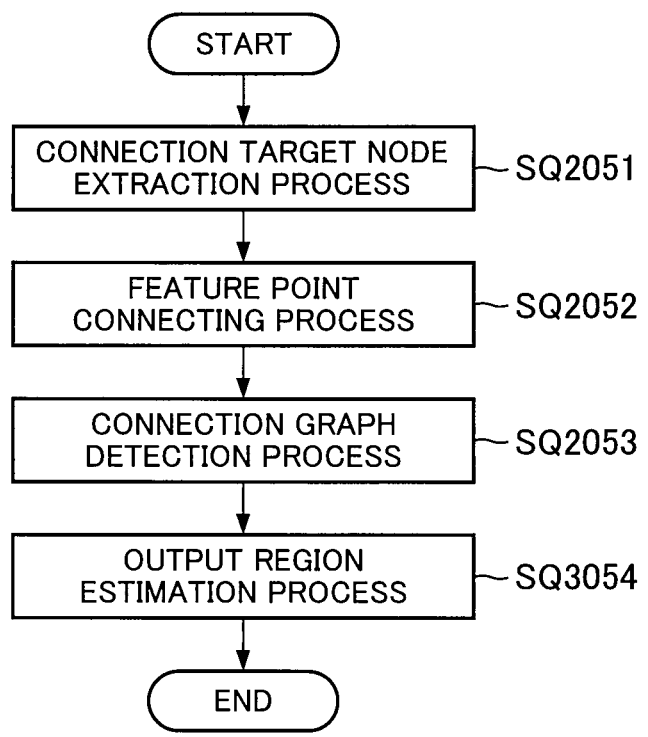
FIG. 15 is a flowchart illustrating an exemplary operation for estimating a corresponding region.

FIG. 15 is a flowchart illustrating an exemplary operation at step SQ305 of estimating a corresponding region. Referring to FIG. 15, step SQ305 differs from step SQ205 of the first exemplary embodiment in that the output region determination process SQ2054 is replaced with an output region estimation process SQ3054.

Figure 16:
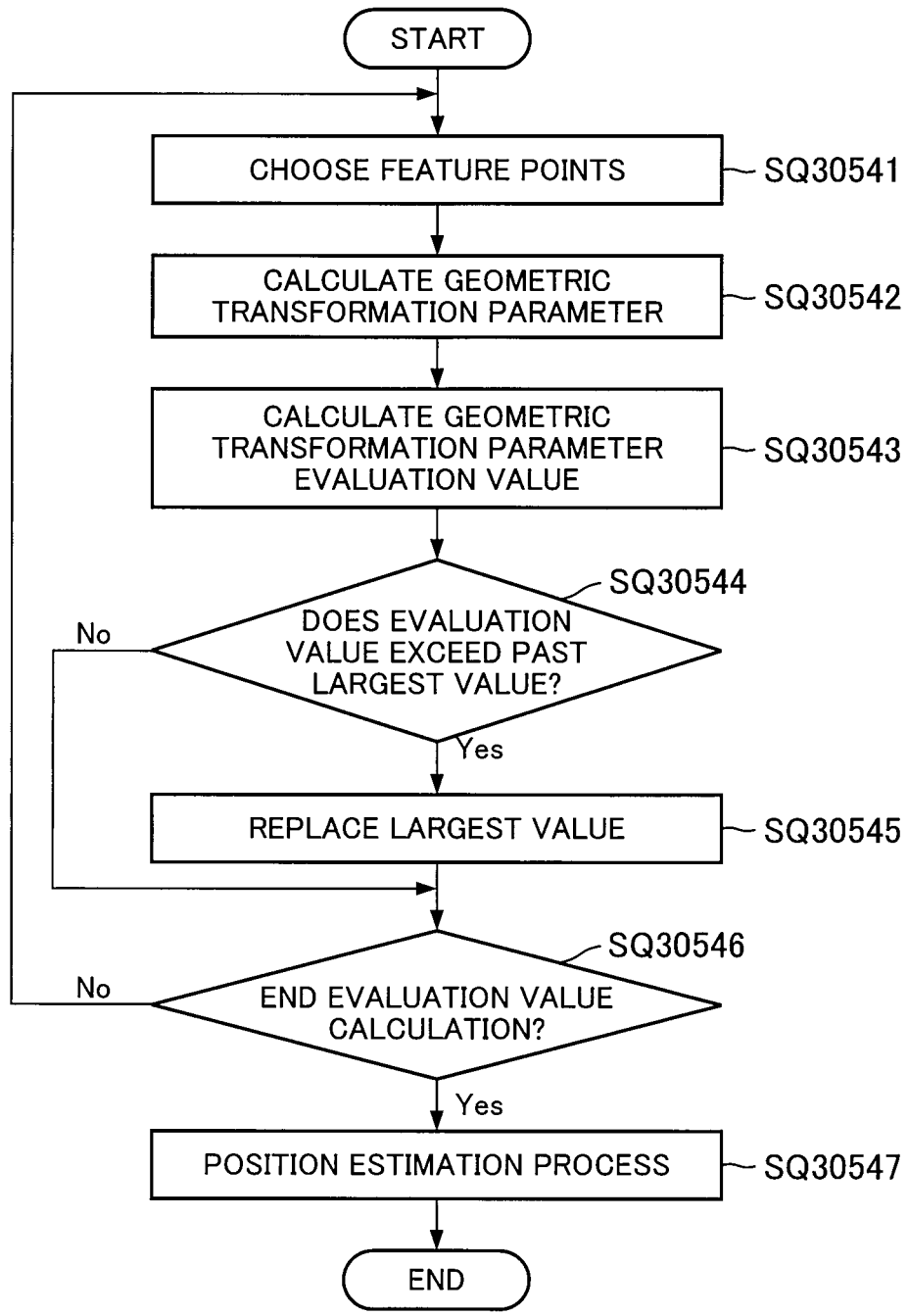
FIG. 16 is a flowchart illustrating an exemplary operation for estimating an output region.

FIG. 16 is a flowchart illustrating an exemplary operation at step SQ3054 of estimating an output region. Referring to FIG. 16, first the corresponding region estimation unit 305 chooses a plurality of feature point pairs that meet conditions, which will be described later, from the feature point match history (step SQ30541). If a homography matrix is used as a geometric transformation parameter, the corresponding region estimation unit 305 may choose four or more feature point pairs; if an affine transformation parameter is used, the corresponding region estimation unit 305 may choose three or more feature point pairs. It is assumed here that a homography matrix is used as a geometric transformation parameter and four feature point pairs are chosen. The conditions that need to be met for choosing feature points are given below.

Feature points chosen as a feature point pair belong to the same connection graph.

If there are five or more feature points that belong to the same connection graph, four pairs are chosen at random.

The corresponding region estimation unit 305 then calculates the geometric transformation parameter (step SQ30542). The homography matrix H is a 3×3 matrix representing the relationship between a position (xr, yr) in the registered image and a position (xq, yq) in the query image. Specifically, the homography matrix H satisfies the Equation 2 given below.

[Equation 3]

$$\alpha \begin{pmatrix} xq \\ yq \\ 1 \end{pmatrix} = H \begin{pmatrix} xr \\ yr \\ 1 \end{pmatrix}$$ (Equation 2)

In Equation 2 given above, α is a constant determined by the values of (xr, yr) and (xq, yq). By using the coordinates of the feature points of chosen four feature point pairs to solve simultaneous equations, a homography matrix can be obtained. If five or more feature point pairs are chosen, the least square method or the like can be used to obtain a homography matrix.

The corresponding region estimation unit 305 then calculates an evaluation value for the geometric transformation parameter (step SQ30543). For example, the corresponding region estimation unit 305 projects all of the feature points in the query image to the registered image by using the homography matrix. Then the corresponding region estimation unit 305 may detect whether or not there are feature points calculated from the registered image within a distance smaller than or equal to a predetermined value among the projected feature points and may use the number of detected feature points as the evaluation value.

The corresponding region estimation unit 305 may project all connected regions that can be obtained from the query image or their circumscribed rectangular regions and may compare them with a sub-region in the registered image that is located in the projected position. In this case, the corresponding region estimation unit 305 may use a known method to determine whether or not there is a match and may use the number of matching regions as the evaluation value.

The corresponding region estimation unit 305 may calculate the distance after detecting a feature quantity and, if the distance is smaller or equal to a given value, may determine that the feature quantity matches. Alternatively, the corresponding region estimation unit 305 may use normalized correlation to determine whether or not there is a match. It can be said from the foregoing that the evaluation value calculated in this way indicates the certainty of the geometric transformation parameter used.

The corresponding region estimation unit 305 then determines, on the basis of the past calculation history, whether or not the calculated evaluation value is the largest in the evaluation values calculated by then (step SQ30544). If the evaluation value just calculated exceeds the past largest value (Yes at step S30544), the corresponding region estimation unit 305 replaces the past largest evaluation value with the current evaluation value and holds the value of the homography matrix (step SQ30545). On the other hand, if the calculated evaluation value does not exceeds the past largest value (No at step SQ30544), the corresponding region estimation unit 305 proceeds to step SQ30546.

The corresponding region estimation unit 305 then determines whether or not to end the evaluation value calculation (step SQ30546). The corresponding region estimation unit 305 may determine to end the evaluation value calculation when the number of iterations of the evaluation value calculation exceeds a predetermined number. Alternatively, the corresponding region determination unit 305 may determine to end the evaluation value calculation when the evaluation value exceeds or is equal to a predetermined value. Note that a method other than these methods may be used to determine whether or not to end the evaluation value calculation. It can be said that the evaluation value thus calculated indicates the highest certainty that the geometric transformation parameter will transform the query image into the registered image under the conditions under which the evaluation value calculation is performed.

If the corresponding region estimation unit 305 determines not to end the evaluation value calculation (No at step SQ30546), step SQ30541 and the subsequent steps are repeated. On the other hand, if the corresponding region estimation unit 305 determines to end the evaluation value calculation (Yes at step SQ30546), the corresponding region estimation unit 305 estimates a position in the registered image that corresponds to the query image and chooses the region in the position as an output region (step SQ50547). In other words, the corresponding region estimation unit 305 extracts the region in the registered image to which the region of the query image is projected as a sub-region on the basis of the calculated homography matrix. Specifically, the corresponding region estimation unit 305 uses the value of the homography matrix that has yielded the largest evaluation value to project the region of the query image into the registered image. For example, if the query image is rectangular, the coordinates of the four corners of the query image are projected by using the homography matrix and the rectangle that is defined by the projected four points is the output region.

As described above, according to this exemplary embodiment, if it is determined that a query image feature quantity and a registered image feature quantity match with each other, the corresponding feature point pair detection unit 304 uses the feature points of the matching feature quantities to generate a feature point match history. Then the corresponding region estimation unit 305 uses the feature point match history to calculate a geometric transformation parameter (a homography matrix), projects the region of the query image to the registered image on the basis of the calculated parameter, and extracts the region in the registered image to which the region is projected as a sub-region.

In other words, this exemplary embodiment is configured to use an estimated homography matrix and the region of a query image to obtain an output region. Accordingly, this exemplary embodiment has, in addition to the advantageous effect of the first exemplary embodiment, the advantageous effect of being capable of stably obtaining an output region that has the size equivalent to the size of a query image even when the feature point matching is imperfect.

Note that while the first and second exemplary embodiments have been described with examples where the registered image to be compared with the query image is fixed (i.e. only one image is registered) for convenience of explanation, the first and second exemplary embodiments can be readily extended to situations where there are a plurality of registered images.

For example, if there are a plurality of registered images, the corresponding region determination unit 205 may determine an output region for each of the registered images and may choose a sub-region on the basis of the registered image with the output region that has the largest indicator of certainty.

Furthermore, the configurations and operations of the image sub-region extraction devices described above have given for the purpose of illustration of implementations. Alterations can be made to the configurations and the order of the operations without departing from the principle of the present invention. Furthermore, not all of the registration process and search process need to be performed on the same device. For example, device A may perform part of the processes and device B may receive results output from device A through an input/output interface and may perform the rest of the processes.

While the present invention will be described below with a specific exemplary embodiment, the scope of the present invention is not limited to the specifics given below. A third exemplary embodiment will be described here in which the image sub-region extraction device described above is applied to an information processing device. In the information processing device described below, information representing information processing to be executed by a target device (hereinafter the information is referred to as action information) for each sub-region in an image registered beforehand (a registered image) is defined. When the information processing device receives an image corresponding to one of the sub-regions, the information processing device causes the target device to execute information processing associated with the sub-region. Note that an image received will be sometimes referred to as a query image in the following description. The target device may be the information processing device itself or may be another device different from the information processing device.

Figure 17:
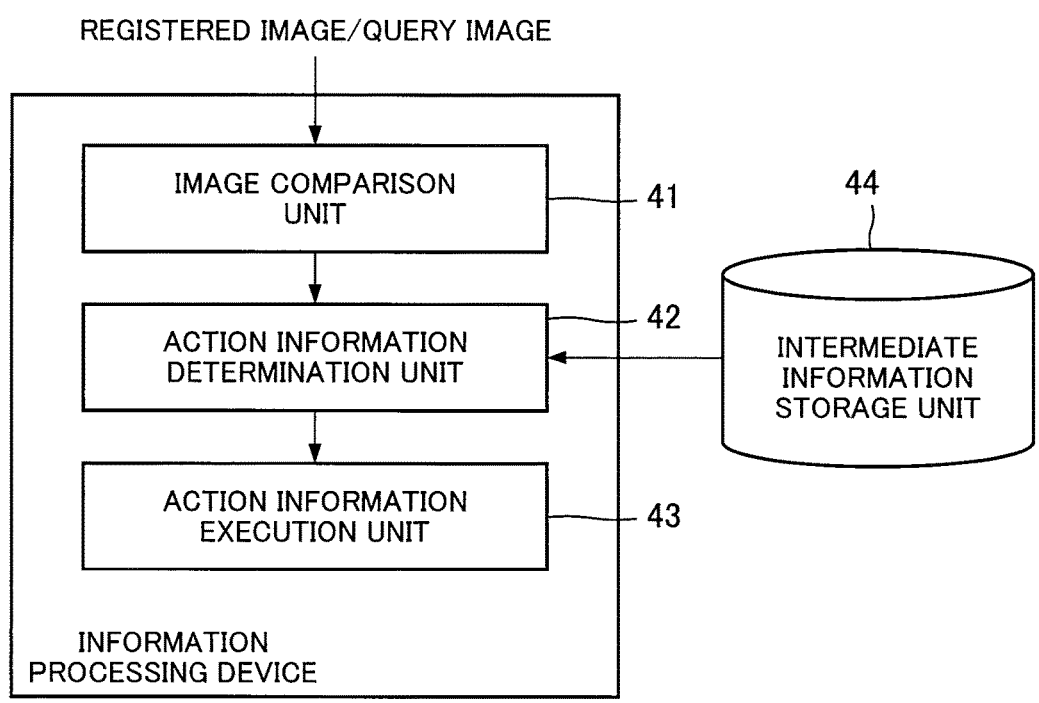
FIG. 17 is a block diagram illustrating an example of an information processing device.

FIG. 17 is a block diagram illustrating an example of an information processing device that extracts sub-regions and performs various kinds of information processing. The information processing device of this exemplary embodiment includes an image comparison unit 41, an action information determination unit 42, and an action information execution unit 43. Note that the information processing device may include an intermediate information storage unit 44.

The intermediate information storage unit 44 stores information in which information identifying sub-regions in a registered image (herein after referred to as sub-region information) and information representing information processing to be executed by a target device (action information) are associated with each other. Hereinafter the information in which the sub-region information and action information are associated with each other will be sometimes referred to as intermediate information. In other words, it can be said that intermediate information is information in which information about a predetermined sub-region and action information that are associated with each other.

For example, if a sub-region is a rectangular region, the coordinates of the four corners that identify the rectangular region is set as the sub-region information. Alternatively, if a registered image is divided into equal blocks, the width and height of each block may be used as the sub-region information. Alternatively, if a registered image is divided into equal blocks, the number of blocks along the horizontal direction and the number of blocks in the vertical direction may be used as the sub-region information. Other kinds of information that can be used as the sub-region information include, but not limited to, the horizontal resolution, the vertical resolution, or the number of blocks of an image.

Furthermore, the action information may be any information by which information processing to be executed by the target device can be identified. For example, if the target device is caused to execute the function of timer-mode recording, information describing the information processing, like "Execute the function of timer-mode recording" or information describing the specific function, like "Display the execution button for executing the function of timer-mode recording", may be set as the action information.

Examples of action information will be described below. If browser display is to be executed, the URL of a page to be displayed may be set as action information. If processing to output a video, a still image or audio is to be executed, the name of a file (the name of a file containing the video, still image or audio) stored in the information processing device may be set as action information. Furthermore, an operation or an execution command of an application that resides on the information processing device or an external device may be set as action information.

For example, when a file name is specified as action information, the action information execution unit 43, which will be described later, may execute an application to be used on the basis of the type of the extension of the file name. Alternatively, an application to be executed may be associated with an XML tag, the XML tag may be explicitly combined with a file name and used as action information.

For example, by setting "<appl>filename.xxx</appl>" as action information, the action of using the application associated with <appl> to open the file "filename.xxx" can be executed. Similarly, <phone> may be associated with an application that makes a phone call to enable the action of making a phone call to a number "xx-xxxx-xxxx" to be specified by setting "<phone>xx-xxxx-xxxx</phone>", for example, as action information. Similarly, <email> may be associated with a mailing application to enable the application to be executed by setting an e-mail address in the form of "<email>xxx@xxx.xxx.xx</emal>", for example, as action information. In this case, the action of automatically inputting a destination mail address (xxx@xxx.xxx.xxx) in a destination field can further be executed.

Note that a plurality of pieces of action information may be associated with one piece of sub-region information. Furthermore, one piece of action information may be associated with a plurality of pieces of sub-region information.

A condition under which the action information execution unit 43 causes execution of information processing may be set in action information. For example, a condition that specifies that the target device executing processing is caused to execute information processing only when the target device is in a certain place (for example in a store) may be set in action information.

The intermediate information storage unit 44 may be implemented by a magnetic disk or the like, for example. The information processing device itself may include the intermediate information storage unit 44.

The image comparison unit 41 detects a sub-region that is equivalent to a query image from a registered image. Specifically, the image comparison unit 41 compares a query image with a registered image to detect a sub-region in the registered image that corresponds to the query image. The image comparison unit 41 may detect only one sub-region or may detect a plurality of sub-regions.

The image comparison unit 41 may use the image sub-region extraction device described in the first or second exemplary embodiment to detect a sub-region in a registered image that corresponds to a query image. Specifically, the image comparison unit 41 may compare the degrees of matching between registered image feature quantities and query image feature quantities to detect corresponding feature points and may extract a sub-region in the registered image that is identified by corresponding feature points that have higher degrees of matching with the feature points in the query image among the detected corresponding feature points.

Note that the image comparison unit 41 in this exemplary embodiment may use a method other than the method described in the first or second exemplary embodiments to detect a sub-region corresponding to a query image in a registered image. However, the use of the method described in the first or second exemplary embodiment is preferable because even if a query image that differs from a registered image in resolution or shooting angle is used, a sub-region corresponding to the query image can be extracted from the registered image.

In the following description, the image comparison unit 41 uses the method in which the image sub-region extraction device of the first exemplary embodiment extracts a sub-region. Specifically, when a registered image feature quantity and a query image feature quantity match, the image comparison unit 41 counts up the number of corresponding feature points and extracts connection target nodes from the registered image. The image comparison unit 41 then generates a connection graph from the connection target nodes. Here, let $(x_{min\_j(k)}, y_{min\_j(k)})$, $(x_{max\_j(k)}, y_{min\_j(k)})$, $(x_{min\_j(k)}, y_{max\_j(k)})$, and $(x_{max\_j(k)}, y_{max\_j(k)})$ denote the coordinates of the four corners of the circumscribed rectangle of a connected region including a node j (j is an integer) in the connection graph. Then the image comparison unit 41 outputs a rectangular region having diagonal vertices at $(x_{min\_min(k)}, y_{min\_min(k)})$ and $(x_{max\_max(k)}, y_{max\_max(k)})$. Here, k is an integer that satisfies $1 \le k \le K_{max}$ where $K_{max}$ is the number of sub-regions.

As noted previously, a method other than the method performed by the image sub-region extraction unit of the first or second exemplary embodiment to extract sub-regions may be used. For example, the image comparison unit 41 may perform known document image layout analysis or the like to automatically specify a sub-region.

The action information determination unit 42 uses information output from the image comparison unit 41 as the result of comparison and intermediate information (i.e. sub-region information and action information) to determine what kind of information processing the information processing device is to execute. Specifically, the action information determination unit 42 chooses a sub-region that has the highest degree of matching with a detected region among the sub-regions identified by the sub-region information and identifies action information associated with the sub-region. Details of the process for identifying action information will be described later.

The action information execution unit 43 executes action information identified by the action information determination unit 42. In particular, the action information execution unit 43 causes the target device to execute processing that corresponds to the identified action information.

Note that the image comparison unit 41, the action information determination unit 42 and the action information execution unit 43 may be implemented by a CPU of a computer that operates in accordance with a program (an information processing execution program). Alternatively, each of the image comparison unit 41, the action information determination unit 42 and the action information execution unit 43 may be implemented by dedicated hardware.

Figure 18:
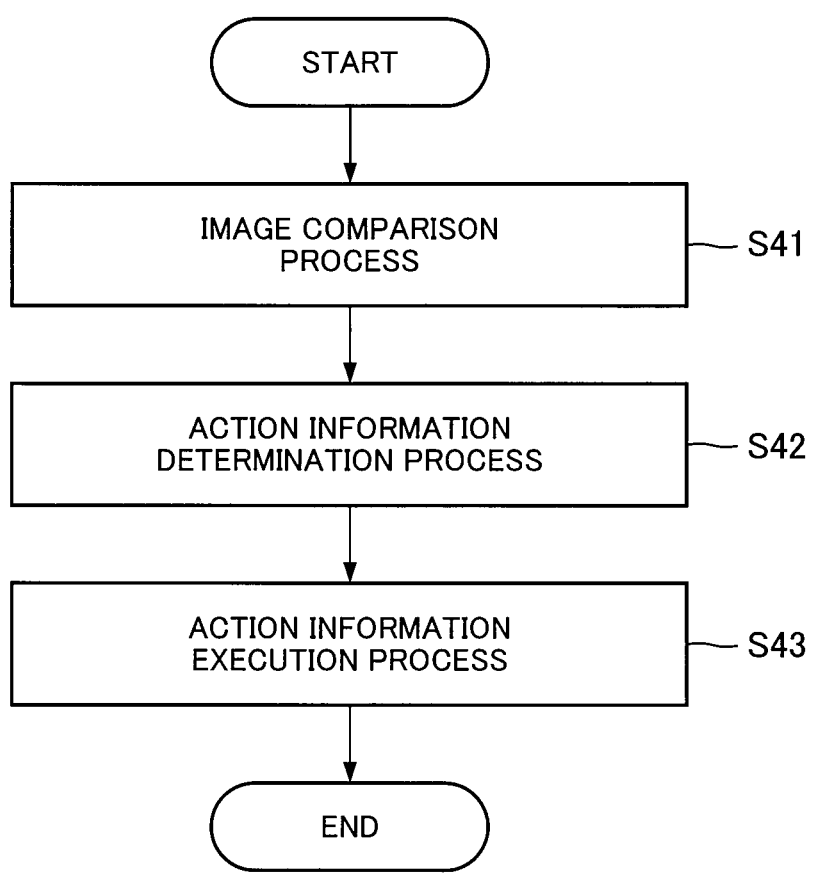
FIG. 18 is a flowchart illustrating an exemplary operation of an information processing device in a third exemplary embodiment.

An operation of this exemplary embodiment will be described below. FIG. 18 is a flowchart illustrating an exemplary operation of the information processing device of this exemplary embodiment. Referring to FIG. 18, the operation of the information processing device of this exemplary embodiment includes an image comparison process (step S41), an action information determination process (step S42), and an action information execution process (step S43).

First, the image comparison unit 41 detects a sub-region in a registered image that corresponds to a query image (step S41). The image comparison unit 41 may perform the same processing that is performed by the image sub-region extraction device of the first or second exemplary embodiment.

Figure 19:
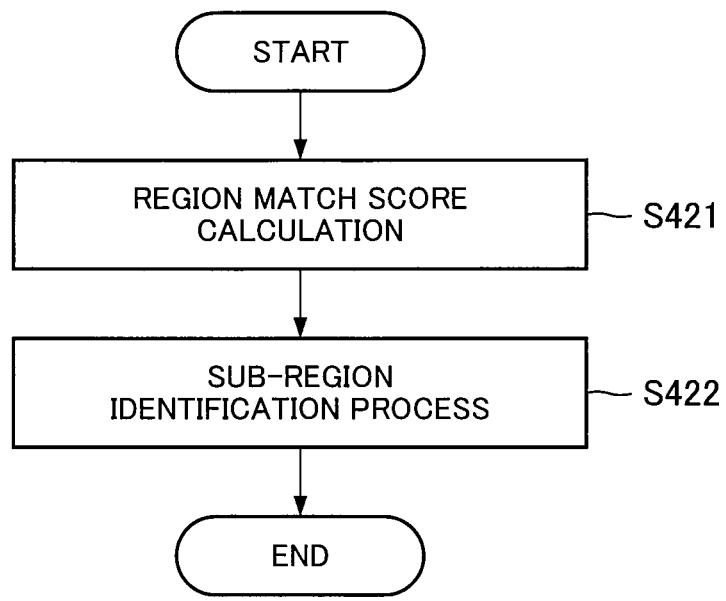
FIG. 19 is a flowchart illustrating an exemplary operation for determining action information.

Then, the action information determination unit 42 determines action information (step S42). FIG. 19 is a flowchart illustrating an exemplary operation for determining action information. The process for determining action information includes a region match score calculation process (step S421) and a sub-region identification process (step S422) for identifying a sub-region that has yielded the largest region match score.

A region match score indicates the degree of matching between a sub-region identified by sub-region information in intermediate information (hereinafter sometimes referred to as an intermediate information sub-region) and a region detected by the image comparison unit 41 (hereinafter referred to as an image comparison sub-region).

First, the action information determination unit 42 calculates a region match score for every combination of a sub-region input from the image comparison unit 41 (an image comparison sub-region) and a sub-region identified by the intermediate information (an intermediate information sub-region) (step S421).

For example, let reg_match(k, c) denote the region matching degree between an image comparison sub-region k ($1 \leq k \leq K_{max}$, where $K_{max}$ is the number of image comparison sub-regions) and an intermediate information sub-region c ($1 \leq c \leq C_{max}$, where $C_{max}$ is the number of sub-regions identified by the intermediate information), then the region matching degree can be defined by Equation 3 given below, for example.

$$\text{reg\_match}(k,c) = ((\text{area of intersection of image comparison sub-region } k \text{ and intermediate information region } c)/(\text{area of union of image comparison sub-region } k \text{ and intermediate information sub-region } c)) \quad \text{(Equation 3)}$$

The action information determination unit 42 then obtains the values of k and c that maximize reg_match(k,c) (step S422). For this purpose, values of reg_match(k, c) calculated for all possible combinations of k and c may be held in a storage medium (not depicted). The values of k and c that maximize reg_match(k, c) are denoted by ka and ca, respectively. In other words, the action information determination unit 42 chooses the intermediate information sub-region c that scores the highest degree of matching with the image comparison sub-region k among the intermediate information sub-regions c.

Then the action information execution unit 43 executes the information processing represented by the action information associated with the intermediate information sub-region ca (step S43). For example, the action information execution unit 43 performs the following information processing in accordance with the action information.

For example, if an URL is set in the action information, the action information execution unit 43 may activate software such as a browser installed in the information processing device or an external device and may call up a content that resides at a specified URL.

Alternatively, for example if a file name of a file (such as a video, still image, audio or text file) in the information processing device or an external device is set in the action information, the action information execution unit 43 may activate any of various browsers or viewers or the like as needed, activate appropriate software, and open the file set in the action information.

Alternatively, if the information processing device includes user interface equipment, the action information execution unit 43 may use the equipment to display an image or output sound. During performing processing for displaying an image or outputting sound, the action information execution unit 43 may perform information processing corresponding to specified information that specifies the type of the image or sound as well as a range to be processed (such as an image display range or a sound playback and end positions, for example) if such information is associated.

If an operation command or an execution command of an application that resides in the information processing device or a device external to the information processing device is set in action information, the action information execution unit 43 may execute the operation command or execution command.

If conditions for causing execution of information processing are set in action information, the action information execution unit 43 may cause the target device to execute the information processing when the set conditions are met.

As described above, according to this exemplary embodiment, the image comparison unit 41 compares a query image with a registered image to detect, in the registered image, a region that corresponds to the query image. The action information determination unit 42 identifies sub-regions on the basis of sub-region information in intermediate information and chooses a sub-region that has the highest degree of matching with the detected region among the identified sub-regions. Since the intermediate information used here is sub-region information and action information that are associated with each other, the action information determination unit 42 identifies action information that is associated with the sub-region. Then the action information execution unit 43 causes the target device to execute information processing corresponding to the action information. Thus, when image information representing a portion of the registered image is input, information processing corresponding to the input image information can be executed.

If the system described in PTL1, for example, is used, information to be presented corresponding to a position cannot be determined. In contrast, the information processing device of this exemplary embodiment automatically determines a position that corresponds to an input query image in a registered image and therefore can perform information processing that is associated with the determined position (i.e. a sub-region).

This exemplary embodiment has been described with an example in which the image comparison unit 41 outputs a sub-region (a rectangular region) by using the method in which the image sub-region extraction device detects a sub-region as described in the first or second exemplary embodiment. In this case, the action information determination unit 42 compares the proportion of an overlap of the output sub-region with each sub-region included in the intermediate information and the proportions of overlaps with the other sub-regions in the intermediate information.

On the other hand, the image comparison unit 41 may output feature points (connection target nodes) instead of a sub-region. In this case, the action information determination unit 42 may compare each of the coordinate values of the connection target nodes with each intermediate information sub-region c and count the connection target nodes in each intermediate information sub-region c. The action information determination unit 42 may then choose a sub-region that has the largest count value. Note that the count may be made by any method. For example, feature points included in a region may be counted up one by one or feature points to be counted may be identified and counted.

This configuration eliminates the need for at least steps SQ2052 and SQ2053 in the first exemplary embodiment if the method in which the image sub-region extraction device detects a sub-region as described in the first or second exemplary embodiment. If feature points in a region are counted up one by one, the need for the process for determining a corresponding region (the process at step SQ205) is eliminated.

While this exemplary embodiment has been described with an example in which a registered image to be compared with a query image is predetermined (i.e. there is only one registered image) for convenience of explanation, this exemplary embodiment can be readily extended to cases where there are a plurality of registered images.

For example, when there are a plurality of registered images, the image comparison unit 41 may calculate the maximum value of the degree of matching of a registered image feature quantity with a query image feature quantity (for example a region match score) for each registered image and may output a sub-region from the registered image that has the largest maximum value. Alternatively, appropriate registered images to be compared with a query image may be determined beforehand by using another, known image recognition technique or image search technique and a sub-region may be output from a registered image that has been determined to be appropriate.

A variation of the third exemplary embodiment will be described next. In the third exemplary embodiment, a method for determining which of the sub-regions identified by intermediate information stored in the intermediate information storage unit 44 is a sub-region output from the image comparison unit 41 has been described. In other words, since the information output from the image comparison unit 41 is a sub-region and intermediate information for identifying sub-regions is stored in the intermediate information storage unit 44 in the third exemplary embodiment, the action information determination unit 42 compares the degrees of matching of sub-regions to identify action information.

It is assumed in this variation that the intermediate information storage unit 44 places identifiers for identifying sub-regions in a registered image in intermediate information beforehand. The identifier for identifying a sub-region in the registered image is hereinafter referred to as a sub-region ID. It is assumed that when the image comparison unit 41 detects a region that is equivalent to a query image from the registered image, the image comparison unit 41 outputs the sub-region ID associated with the detected region. In this case, the image comparison unit 41 refers to the sub-region IDs included in the intermediate information to determine which of the sub-region IDs is associated with the sub-region in the registered image that has been obtained as a result of comparison between the registered image and the query image.

Specifically, if a sub-region ID included in the intermediate information can be uniquely identified from a detected sub-region, the image comparison unit 41 may output the sub-region ID. If there are a plurality of sub-region IDs identified from a detected sub-region, the image comparison unit 41 may calculate the degree of matching in area with each sub-region as in the method described above and given in Equation 3 and may output the sub-region ID of a sub-region that has a higher degree of matching.

Since the image comparison unit 41 outputs a sub-region ID as a result of comparison, the action information determination unit 42 can identify action information associated with the sub-region ID (more specifically, action information associated with sub-region information identified by the sub-region ID).

The intermediate information storage unit 44 may divide and store at least any one of an image and feature quantities for each sub-region ID in intermediate information and the image comparison unit 41 may use the images or feature quantities for comparison with an image. Specifically, the image comparison unit 41 may compare a query image with each of the images into which an image is divided and outputs a sub-region ID associated with a region detected in a registered image and the action information determination unit 42 may identify action information associated with the sub-region ID. Hereinafter, each of the images into which a registered image is divided is referred to as a segment image. A segment image is an image used for identifying a sub-region in the registered image and may or may not be an image in the same range as the sub-region identified by a sub-region ID.

In particular, the intermediate information storage unit 44 may store an image included in the same region as the sub-region identified by a sub-region ID as a segment image. Alternatively, the intermediate information storage unit 44 may store a portion of the segment image as a segment image. Note that a particular portion can be extracted by using a known technique such as document image layout analysis, for example. By reducing the size of an image to be registered in this way, the amount of data stored can be reduced.

Alternatively, the intermediate information storage unit 44 may store an image included in a region to which the sub-region identified by a sub-region ID is expanded as a segment image. Any method may be used for expanding a region; for example, a sub-region may be expanded in whole. By using an image including regions adjacent to the sub-region identified by a sub-region ID in this way, the accuracy of comparison can be increased.

Furthermore, the intermediate information storage unit 44 may previously store feature quantities that are used by the image comparison unit 41 for comparison as with the segment image stored. Specifically, the intermediate information storage unit 44 may store feature quantities of an image included in the same region as the sub-region identified by a sub-region ID or may store feature quantities of an image included in a region greater than or smaller than a sub-region. The feature quantities in this case may be calculated in the same way that feature quantities used by the image comparison unit 41 for comparison are calculated.

In this case, the image comparison unit 41 may compare stored feature quantities with feature quantities in a query image and output the sub-region ID associated with a detected region in the registered image and the action information determination unit 42 may identify the action information associated with the sub-region ID.

Note that when such information is stored in the intermediate information storage unit 44, an intermediate information generation unit (not depicted), for example, may refer to an image of each of the sub-regions included in the intermediate information to choose a segment image or a feature quantity, assign a sub-region ID to the chosen segment image or feature quantity, and automatically store the segment image or feature quantity with the sub-region ID in the intermediate information storage unit 44. Alternatively, a unit image or a unit feature quantity for comparison by the image comparison unit 41 may be predetermined and the unit image or the unit feature quantity may be associated with each sub-region in the intermediate information.

In this way, one large registered image may be divided into a plurality of small registered images equivalent to sub-regions, for example, and stored in the intermediate information storage unit 44 and the image comparison unit 41 may use each of the images into which the registered image is divided or a feature quantity calculated from the image for image comparison. Note that identifying a position from the entire registered image is more preferable because a sub-region corresponding to a query image can be extracted from a registered image by using the method in the first or second exemplary embodiment even if the query image used differs in resolution or shooting angle from the registered image.

Note that sub-region IDs may be included in intermediate information and explicitly stored by the intermediate information storage unit 44. Furthermore, the order in which pieces of intermediate information are stored in the intermediate information storage unit 44 and the order in which files are stored as intermediate information may be implicitly used as sub-region IDs. This also applies to sub-region IDs assigned to images or feature quantities stored as intermediate information.

Practical examples of the use of the information processing device of the third exemplary embodiment will be described next.

Practical Example 1

A practical example in which the information processing device of the third exemplary embodiment is caused to operate as a remote control device will be described first. In the first practical example, an exemplary operation performed when action information has been set for each sub-region in a registered image representing a program listing in a television guide magazine (hereinafter simply referred to as the program listing) will be described.

When the program listing is used in the form of a registered image, broadcast program blocks can be used as sub-regions and action information such as timer-mode recording, a channel selection instruction, or VoD (Video on Demand) viewing content purchase instruction can be associated with pieces of sub-region information indicating the sub-regions. It is assumed here that the intermediate information storage unit 44 stores at least one of action information that causes execution of timer-mode recording, action information that causes issuance of a video-on-demand viewing request, and action information that causes execution of a video content purchase process.

When the information processing device receives an image of a portion of the program listing, the image comparison unit 41 identifies a sub-region (i.e. the broadcast program of interest) in a registered image. The action information determination unit 42 compares the time measured by an internal timer in the information processing device with the broadcast time for the broadcast program of interest in the identified sub-region.

The action information determination unit 42 may determine to display an operation screen for channel selection if the broadcast time for the broadcast program of interest is before the measured time. On the other hand, if the broadcast time for the broadcast program of interest is after the measured time, the action information determination unit 42 may determine to display an operation screen for programming timer-mode recording of the broadcast program of interest. Alternatively, if the broadcast time for the broadcast program of interest is after the measured time, the action information determination unit 42 may determine to display an operation screen for requesting video-on-demand viewing or may determine to display an operation screen for purchasing or inquiring about the video content of the broadcast program of interest.

For the purpose of performing such a determination process, action information may include a description of a process for comparing measured time and broadcast time and a description of information processing to be executed on the basis of the result of the comparison. The action information execution unit 43 executes information processing in accordance with action information determined by the action information determination unit 42.

Practical Example 2

A practical example will be described in which the information processing device of the third exemplary embodiment is caused to operate as a device that presents an article in a newspaper. In the second practical example, an exemplary operation which is performed if action information is set for each of the sub-regions in a registered image that represents newspaper articles. When newspaper articles are used as a registered image, article blocks can be treated as sub-regions and action information can be associated with each of pieces of sub-region information representing the sub-regions. Specifically, information processing for causing the information processing device to read out a newspaper article or instructing to play back video data or display a related page available on the Web can be set as action information.

When the information processing device receives an image of a portion of an article in a newspaper, the image comparison unit 41 identifies a sub-region (i.e. an article of interest) in a registered image. If the action information determination unit 42 determines that an article block is included in the sub-region, the action information determination unit 42 identifies action information associated with sub-region information representing the sub-region. Then the action information determination unit 42 may determine to display to a user a screen indicating that read-out data is available. In this case, the action information execution unit 43 displays the screen and, in response to a user instruction to execute a displayed action (reading-out), starts sound playback to read out the article.

If a video is specified in action information, the action information determination unit 42 may determine to display a screen indicating to the user that the video is available. In this case, the action information execution unit 43 plays back the video.

If the article of interest is an advertisement, a link to a shopping site may be set in action information. For example, upon receipt of an image of the advertisement, the action information determination unit 42 may determine to display a screen indicating a link to a shopping site and the action information execution unit 43 may activate a browser to display the shopping site.

Practical Example 3

A practical example in which the information processing device of the third exemplary embodiment is caused to operate as a terminal device used in a bookstore or a library that deals with books will be described next. In the third practical example, an exemplary operation will be described that is performed if action information is set for each sub-region in a registered image representing the cover or spine label of a book (such as a magazine). If the cover or spine label of a book is used in the form of a registered image, a block of a region by which the book can be identified may be used as a sub-region and action information can be associated with sub-region information representing the sub-region.

Specifically, information processing for viewing the content of a book can be set as action information. It is assumed in this practical example that the terminal device is connected to a wireless network in a store or a facility and action information specifies that a process according to the action information can be executed only within the wireless network area.

For example, when the information processing device receives an image of a portion of the cover or spine label of a book, the image comparison unit 41 identifies a sub-region in a registered image. If the action information determination unit 42 determines that a portion of the cover or spine label of the book is included in the sub-region, the action information determination unit 42 identifies action information associated with the sub-region information representing the sub-region. Specifically, the action information determination unit 42 may identify the book from the image and may determine to display a content of the book. In this case, the action information execution unit 43 may display the content of the book only when the terminal is located in the wireless network area. If the information processing device has confirmed completion of a checkout process or a purchase process, the action information execution unit 43 may allow the content of the book to be displayed even after the terminal moves out of the wireless network area.

Practical Example 4

A practical example in which the information processing device according to the third exemplary embodiment is caused to operate as a terminal device that displays tourist spot information will be described next. In the fourth practical example, an exemplary operation will be described that is performed if action information is set for each of the sub-regions in a registered image that represents a tourist spot map displayed on a signboard at a tourist spot. If a tourist spot map is used in the form of a registered image, blocks of a portion such as an area displaying a tourist spot or a section containing description of a tourist spot are used as sub-regions and action information can be associated with sub-region information representing the sub-regions. Specifically, information processing for displaying tourist spot information can be set as action information.

When the information processing device receives an image of a portion of a tourist spot map, the image comparison unit 41 identifies a sub-region (i.e. tourist spot information) in a registered image. When the action information determination unit 42 determines that the sub-region includes an article block, the action information determination unit 42 identifies action information associated with sub-region information representing the sub-region. Then the action information determination unit 42 may determine to present tourist spot information. In this case, the action information execution unit 43 performs a process for displaying registered tourist spot information on a screen or playing back video data.

Note that if images of a tourist spot map displayed on a signboard are taken, the images may have different resolutions and sizes because the signboard may be large. The use of the image sub-region extraction device of the first or second exemplary embodiment allows a sub-region to be properly identified and therefore enables information processing using the sub-region to be properly performed.

Figure 20:
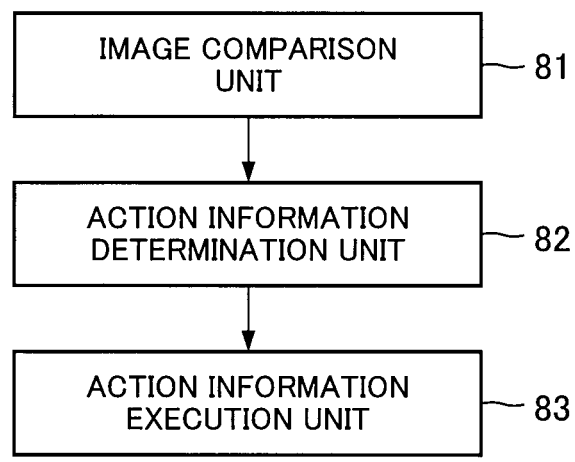
FIG. 20 is a block diagram illustrating an overview of an information processing device of the present invention.

FIG. 20 is a block diagram illustrating an overview of an information processing device of the present invention. The information processing device of the present invention includes an image comparison unit 81 (for example the image comparison unit 41) which compares a query image with a registered image to detect, in a registered image, a region corresponding to the query image, an action information determination unit 82 (for example the action information determination unit 42) which identifies sub-regions on the basis of sub-region information from intermediate information in which the sub-region information identifying sub-regions in the registered image and action information representing information processing to be executed by a target device are associated with each other, chooses a sub-region that has the highest degree of matching with the detected region (for example the highest region match score) among the identified sub-regions, and identifies action information corresponding to the sub-region, and an action information execution unit 83 (for example the action information execution unit 43) which causes the target device to execute information processing corresponding to the action information.

When image information indicating a portion of the registered image is input, information processing corresponding to the input image information can be executed with the configuration described above.

Specifically, the image comparison unit 81 may output a region in the registered image that corresponds to the query image. Then the action information determination unit 82 may calculate the proportion of an overlap of the output region with each identified sub-region as the degree of matching and may choose a sub-region that has the highest degree of matching.

On the other hand, the image comparison unit 81 may output feature points (for example connection target nodes)

corresponding to the query image in the registered image. Then the action information determination unit 82 may calculate the number of the output feature points in an identified sub-region as the degree of matching and may choose a sub-region that has the highest degree of matching.

Furthermore, the intermediate information may include, as sub-region information, sub-region IDs identifying sub-regions. In this case, the image comparison unit 81 may output a sub-region ID corresponding to a detected region in the registered image and the action information determination unit 82 may identify action information associated with the sub-region ID.

Furthermore, the intermediate information may include sub-region information in which segment images into which the registered image is divided and sub-region IDs are associated with each other. In this case, the image comparison unit 81 may compare a query image with the segment images and may output a sub-region ID corresponding to a detected region in the registered image.

The intermediate information may include at least one of action information causing execution of timer-mode recording, action information causing issuance of a video-on-demand viewing request, and action information causing execution of a video content purchase process.

Although a part or all of the exemplary embodiments mentioned above can also be described as the following supplementary notes, they are not limited to the followings.

(Supplementary Note 1)

An information processing device including: an image comparison unit which compares a query image with a registered image to detect, in the registered image, a region corresponding to the query image; an action information determining unit which, on the basis of intermediate information in which sub-region information identifying sub-regions in the registered image and action information representing information processing to be executed by a target device are associated with each other, identifies sub-regions on the basis of the sub-region information, chooses a sub-region having the highest degree of matching with the detected region among the identified sub-regions, and identifies action information corresponding to the chosen sub-region; and an action information execution unit which causes the target device to execute information processing corresponding to the action information.

(Supplementary Note 2)

The information processing device according to Supplementary note 1, wherein the image comparison unit outputs the region in the registered image that corresponds to the query image; and the action information determining unit calculates the proportion of the output region overlapping the identified sub-region to the identified sub-region as the degree of matching and chooses a sub-region that has the highest degree of matching.

(Supplementary Note 3)

The information processing device according to Supplementary note 1, wherein the image comparison unit outputs feature points in the registered image, the feature points corresponding to the query image; and the action information determining unit calculates the number of output feature points included in the identified sub-region as the degree of matching and chooses a sub-region that has the highest degree of matching.

(Supplementary Note 4)

The information processing device according to any one of Supplementary notes 1 to 3, wherein the intermediate information includes sub-region IDs identifying sub-regions as sub-region information; the image comparison unit outputs a sub-region ID corresponding to the detected region in the registered image; and the action information determination unit identifies action information corresponding to the sub-region ID.

(Supplementary Note 5)

The information processing device according to Supplementary note 4, wherein the intermediate information includes sub-region information in which segment images and sub-region IDs are associated with each other, the segment image being images into which the registered image is divided; and the image comparison unit compares the query image with the segment images and outputs a sub-region ID corresponding to a detected region in the registered image.

(Supplementary Note 6)

The information processing device according to any one of Supplementary notes 1 to 5, wherein the intermediate information includes at least one of action information causing execution of timer-mode recording of a broadcast program, action information causing issuance of a video-on-demand viewing request, and action information causing execution of a video content purchase process.

(Supplementary Note 7)

An information processing method including: comparing a query image with a registered image to detect, in the registered image, a region corresponding to the query image; on the basis of intermediate information in which sub-region information identifying sub-regions in the registered image and action information representing information processing to be executed by a target device are associated with each other, identifying sub-regions on the basis of the sub-region information, choosing a sub-region having the highest degree of matching with the detected region among the identified sub-regions, and identifying action information corresponding to the chosen sub-region; and causing the target device to execute information processing corresponding to the action information.

(Supplementary Note 8)

The information processing method according to Supplementary note 7, wherein the comparing outputs the region in the registered image that corresponds to the query image; and the choosing calculates the proportion of the output region overlapping the identified sub-region to the identified sub-region as the degree of matching and chooses a sub-region that has the highest degree of matching.

(Supplementary Note 9)

The information processing method according to Supplementary note 7, wherein the comparing outputs feature points in the registered image, the feature points corresponding to the query image; and the choosing calculates the number of output feature points included in the identified sub-region as the degree of matching and chooses a sub-region that has the highest degree of matching.

(Supplementary Note 10)

The information processing method according to any one of Supplementary notes 7 to 9, wherein the intermediate information includes sub-region IDs identifying sub-regions as sub-region information; the comparing outputs a sub-region ID corresponding to the detected region in the registered image; and the identifying action information identifies action information corresponding to the sub-region ID.

(Supplementary Note 11)

The information processing method according to Supplementary note 10, wherein the intermediate information includes sub-region information in which segment images and sub-region IDs are associated with each other, the segment image being images into which the registered image is divided; and the comparing compares the query image with the segment images and outputs a sub-region ID corresponding to a detected region in the registered image.

(Supplementary Note 12)

The information processing method according to any one of Supplementary notes 7 to 11, wherein the intermediate information includes at least one of action information causing execution of timer-mode recording of a broadcast program, action information causing issuance of a video-on-demand viewing request, and action information causing execution of a video content purchase process.

(Supplementary Note 13)

An information processing program, causing a computer to execute processes including: an image comparison process for comparing a query image with a registered image to detect, in the registered image, a region corresponding to the query image; an action information determining process for, on the basis of intermediate information in which sub-region information identifying sub-regions in the registered image and action information representing information processing to be executed by a target device are associated with each other, identifying sub-regions on the basis of the sub-region information, choosing a sub-region having the highest degree of matching with the detected region among the identified sub-regions, and identifying action information corresponding to the chosen sub-region; and an action information execution process for causing the target device to execute information processing corresponding to the action information.

(Supplementary Note 14)

The information processing program according to Supplementary note 13, causing the computer to execute: in the image comparison process, outputting the region in the registered image that corresponds to the query image; and in the action information determining process, calculating the proportion of the output region overlapping the identified sub-region to the identified sub-region as the degree of matching and choosing a sub-region that has the highest degree of matching.

(Supplementary Note 15)

The information processing program according to Supplementary note 13, causing the computer to execute: in the image comparison process, outputting feature points in the registered image, the feature points corresponding to the query image; in the action information determining process, calculating the number of output feature points included in the identified sub-region as the degree of matching and choosing a sub-region that has the highest degree of matching.

(Supplementary Note 16)

The information processing program according to any one of Supplementary notes 13 to 15, wherein the intermediate information includes sub-region IDs identifying sub-regions as sub-region information, and causing the computer to execute: in the image comparison process, outputting a sub-region ID corresponding to the detected region in the registered image; and in the action information determination process, identifying action information corresponding to the sub-region ID.

(Supplementary Note 17)

The information processing program according to Supplementary note 16, wherein the intermediate information includes sub-region information in which segment images and sub-region IDs are associated with each other, the segment image being images into which the registered image is divided, and causing the computer to execute: in the image comparison process, comparing the query image with the segment images and outputting a sub-region ID corresponding to a detected region in the registered image.

(Supplementary Note 18)

The information processing program according to any one of Supplementary notes 13 to 17, wherein the intermediate information includes at least one of action information causing execution of timer-mode recording of a broadcast program, action information causing issuance of a video-on-demand viewing request, and action information causing execution of a video content purchase process.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-230886, filed on Oct. 18, 2012, the disclosure of which is incorporated herein in its entirety by reference.

INDUSTRIAL APPLICABILITY

The present invention is widely applicable to information processing devices that execute information processing using an image of a content captured from any of various documents by a user as a key.

For example, the present invention is applicable to an information processing device that searches an object (such as paper or a board) in the real world on which characters are written, such as newspaper or magazine articles, advertisements, explanatory materials or the like, for example, for a digital information. Furthermore, the present invention is applicable to an information processing device that enables timer-mode recording of a broadcast program, video viewing, video content purchase, and the like from a television guide magazine. The present invention is also applicable to an information processing device that identifies a postal matter from an image of a postal matter or a delivery package. Furthermore, the present invention is applicable to a device that recognizes a destination address region or a sender address region on a postal matter or a delivery package.

REFERENCE SIGNS LIST

1 Information processing system
R201 Registered-image feature-point generation unit
R202 Registered-image feature-point-arrangement generation unit
R203 Registered-image feature-quantity generation unit
Q201 Query-image feature-point generation unit
Q202 Query-image feature-point-arrangement generation unit
Q203 Query-image feature-quantity generation unit
204 Corresponding feature point detection unit
205 Corresponding region determination unit
304 Corresponding feature point pair detection unit
305 Corresponding region estimation unit
41 Image comparison unit
42 Action information determination unit
43 Action information execution unit
44 Intermediate information storage unit

What is claimed is:

1. An information processing device comprising:
a memory storing instructions; and
one or more processors configured to execute the instructions to:
compare a query image with a registered image to detect, in the registered image, a region corresponding to the query image;
choose a sub-region having a highest degree of matching with the region corresponding to the query image among sub-regions in the registered image;
based on information in which each of the sub-regions in the registered image and information processing to be executed by a target device are associated with each other, identify information processing associated with the chosen sub-region; and
cause the target device to execute identified information processing.

2. The information processing device according to claim 1, wherein
when comparing a query image with a registered image, the region in the registered image is outputted; and
when choosing a sub-region, the proportion of the output region overlapping the sub-region to the sub-region is calculated as the degree of matching and the sub-region that has the highest degree of matching is chosen.

3. The information processing device according to claim 1, wherein
when comparing a query image with a registered image, feature points in the registered image are output, the feature points corresponding to the query image; and
when choosing a sub-region, the number of output feature points included in the sub-region is calculated as the degree of matching and the sub-region that has the highest degree of matching is chosen.

4. The information processing device according to claim 1, wherein
the information includes sub-region IDs respectively identifying sub-regions;
when comparing a query image with a registered image, a sub-region ID associated with the region corresponding to the query image in the registered image is output; and
when identifying information processing, information processing associated with the sub-region is identified.

5. The information processing device according to claim 4, wherein
the information includes a segment image and a sub-region ID in association with each other, the segment image being images into which the registered image is divided; and
when comparing a query image with a registered image, the query image is compared with the segment images and a sub-region ID associated with the segment image corresponding to the query image in the registered image is output.

6. The information processing device according to claim 1, wherein
the information includes, as the information processing, at least one of timer-mode recording of a broadcast program, issuance of a video-on-demand viewing request, and a video content purchase process.

7. An information processing method comprising:
comparing a query image with a registered image to detect, in the registered image, a region corresponding to the query image;
choosing a sub-region having a highest degree of matching with the region corresponding to the query image among the sub-regions in the registered image;
based on information in which each of the sub-regions in the registered image and information processing to be executed by a target device are associated with each other, identifying information processing associated with the chosen sub-region; and
causing the target device to execute identified information processing.

8. The information processing method according to claim 7, wherein
the comparing outputs the region in the registered image that corresponds to the query image; and
the choosing calculates the proportion of the output region overlapping the sub-region to the sub-region as the degree of matching and chooses a sub-region that has the highest degree of matching.

9. A non-transitory computer readable storage medium recording thereon an information processing program, causing a computer to perform a method comprising:
comparing a query image with a registered image to detect, in the registered image, a region corresponding to the query image;
choosing a sub-region having a highest degree of matching with the region corresponding to the query image among sub-regions in the registered image;
based on information in which each of the sub-regions in the registered image and information processing to be executed by a target device are associated with each other, identifying information processing associated with the chosen sub-region; and
causing the target device to execute identified information processing.

10. The non-transitory computer readable storage medium recording thereon the information processing program according to claim 9, wherein
the comparing outputs the region in the registered image that corresponds to the query image; and
the choosing calculates the proportion of the output region overlapping the sub-region to the sub-region as the degree of matching and chooses a sub-region that has the highest degree of matching.

11. An information processing device comprising:
a means for comparing a query image with a registered image to detect, in the registered image, a region corresponding to the query image;
a means for, choosing a sub-region having a highest degree of matching with the region corresponding to the query image among sub-regions in the registered image;
a means for, based on information in which each of the sub-regions in the registered image and information processing to be executed by a target device are associated with each other, identifying information processing associated with the chosen sub-region; and
a means for causing the target device to execute identified information processing.

* * * * *